US011496746B2

(12) United States Patent
Siddaramanna et al.

(10) Patent No.: US 11,496,746 B2
(45) Date of Patent: Nov. 8, 2022

(54) MACHINE LEARNING BASED RATE-DISTORTION OPTIMIZER FOR VIDEO COMPRESSION

(71) Applicant: QUALCOMM Incorporated, San Diego, CA (US)

(72) Inventors: Mahant Siddaramanna, San Diego, CA (US); Naveen Srinivasamurthy, Bangalore (IN); Apoorva Nagarajan, Bangalore (IN); Prasant Shekhar Singh, Bangalore (IN); Pawan Kumar Baheti, Bangalore (IN); Narendranath Malayath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/165,680

(22) Filed: Feb. 2, 2021

(65) Prior Publication Data

US 2022/0256169 A1    Aug. 11, 2022

(51) Int. Cl.
*H04N 19/147* (2014.01)
*H04N 19/159* (2014.01)
(Continued)

(52) U.S. Cl.
CPC ......... *H04N 19/147* (2014.11); *G06N 3/0454* (2013.01); *H04N 19/159* (2014.11); *H04N 19/176* (2014.11); *H04N 19/19* (2014.11)

(58) Field of Classification Search
CPC .. H04N 19/147; H04N 19/159; H04N 19/176; H04N 19/19; G06N 3/0454
See application file for complete search history.

(56) References Cited

U.S. PATENT DOCUMENTS

| 2009/0067495 A1* | 3/2009 | Au ......................... H04N 19/61 375/240.12 |
| 2018/0288420 A1* | 10/2018 | Yu ........................ H04N 19/172 |

(Continued)

FOREIGN PATENT DOCUMENTS

| CN | 109309834 A | 2/2019 |
| WO | 2019199716 A1 | 10/2019 |

OTHER PUBLICATIONS

Amonou., et al.,"VideoCodingTechnologyProposalbyFranceTelecom, NTT, NTT DoCoMo, PanasonicandTechnicolor",ReferenceEncoding Model, 1.JCT-VCMeeting,Apr. 15, 2010-Apr. 23, 2010,Dresden,(JointCollaborativeTeamon VideoCodingofISO/IECJTC1/SC29AWG11ANDITU-TSG.16),No. JCTVC-A114-AnnexB,13 (Year: 2012).*

(Continued)

*Primary Examiner* — Dramos Kalapodas
(74) *Attorney, Agent, or Firm* — Polsinelli LLP

(57) ABSTRACT

Systems and techniques are described for data encoding using a machine learning approach to generate a distortion prediction $\hat{D}$ and a predicted bit rate $\hat{R}$, and to use $\hat{D}$ and $\hat{R}$ to perform rate-distortion optimization (RDO). For example, a video encoder can generate the distortion prediction $\hat{D}$ and the bit rate residual prediction $\widehat{R_{res}}$ based on outputs of the one or more neural networks in response to the one or more neural networks receiving a residual portion of a block of a video frame as input. The video encoder can determine bit rate metadata prediction $\widehat{R_{meta}}$ based on metadata associated with a mode of compression, and determine $\hat{R}$ to be the sum of $\widehat{R_{res}}$ and $\widehat{R_{meta}}$. The video encoder can determine a rate-distortion cost prediction $\hat{J}$ as a function of $\hat{D}$ and $\hat{R}$, and can determine a prediction mode for compressing the block based on $\hat{J}$.

30 Claims, 10 Drawing Sheets

(51) Int. Cl.
    *H04N 19/19* (2014.01)
    *G06N 3/04* (2006.01)
    *H04N 19/176* (2014.01)

(56) References Cited

U.S. PATENT DOCUMENTS

| 2019/0122073 | A1* | 4/2019 | Ozdemir | A61B 5/7267 |
| 2020/0021865 | A1* | 1/2020 | Topiwala | G06T 7/0002 |
| 2020/0186808 | A1* | 6/2020 | Joshi | H04N 19/159 |
| 2020/0186809 | A1* | 6/2020 | Mukherjee | G06T 9/002 |

OTHER PUBLICATIONS

Santamariam., et al.,"EstimationofRateControlParametersforVideo CodingUsingCNN", arxiv.org,Cornell UniversityLibrary,201 OLIN LibraryCornellUniversityIthaca, NY 14853,Mar. 13, 2020(Mar. 13, 2020),XP081620993,DOI:10.1109/VCIP.2018.8698721,4 Pages, sectionIII. (Year: 2020).*

Ma, S. et al., "Image and Video Compression with Neural Networks: A Review", IEEE Transactions on Circuits and Systems for Video Technology, Apr. 10, 2019, pp. 1-16.

Amonou I., et al., "Video Coding Technology Proposal by France Telecom, NTT, NTT DoCoMo, Panasonic and Technicolor", AnnexB CDCM Video Codec: Reference Encoding Model, 1. JCT-VC Meeting, Apr. 15, 2010-Apr. 23, 2010, Dresden, (Joint Collaborative Team on Video Coding of ISO/IEC JTC1/SC29/WG11 and ITU-T SG.16), No. JCTVC-A114-AnnexB, Apr. 13, 2010 (Apr. 13, 2010), XP030233017, 46 Pages, Retrieved from the Internet: URL: http://phenix.int-evry.fr/jct/doc_end_user/documents/1_Dresden/wg11/JCTVC-A114.zip JCTVC-A114-AnnexB.doc [Retrieved on Mar. 19, 2012] Sections 2.3.3, 2.5.

International Search Report and Written Opinion—PCT/US2021/072765—ISA/EPO—dated Apr. 4, 2022.

Santamaria M., et al., "Estimation of Rate Control Parameters for Video Coding Using CNN", arxiv.org, Cornell University Library, 201 Olin Library Cornell University Ithaca, NY 14853, Mar. 13, 2020 (Mar. 13, 2020), XP081620993, DOI: 10.1109/VCIP.201 8.8698721,4 Pages, section III.

* cited by examiner

MACHINE LEARNING BASED RATE-DISTORTION OPTIMIZER FOR VIDEO COMPRESSION

FIELD

This application is related to data processing. More specifically, this application relates to technologies and techniques for predicting values, such as distortion and bit rate, using artificial intelligence for use in rate distortion optimization (RDO) for data compression.

BACKGROUND

Data compression is the process of encoding information for data using fewer bits than an original representation of the data. Lossless data compression techniques do not lose any information from the original data file in the compression process. Instead, lossless data compression simply stores the data more efficiently, for instance by removing redundancies. Lossy compression techniques, on the other hand, lose some information that is deemed less necessary or important from the original data file. A device that performs data compression is referred to as an encoder. A device that reverses the data compression process (decompression) to recreate data from the original data file as closely as possible is referred to as a decoder.

Rate distortion optimization (RDO) is a technique that can be used to optimize data compression. However, RDO is very computationally expensive. For instance, in video compression, RDO traditionally entails searching for optimal video compression settings that strike an optimal balance of minimizing both bit rate and distortion. RDO traditionally searches for the optimal video compression settings by performing multiple passes of encoding and decoding under different video compression settings and calculating bit rate and distortion under each pass. Because RDO is so computationally expensive, most encoders use techniques other than RDO that are less computationally expensive than RDO but produce inferior video compression. A file encoded using a technique other than RDO is generally larger and more distorted than a file encoded using RDO-based compression.

SUMMARY

Systems and techniques are described for data encoding using an artificial intelligence based system (e.g., a machine learning system including one or more neural networks) to generate a predicted distortion $\hat{D}$ and a predicted bit rate $\hat{R}$, and to use $\hat{D}$ and $\hat{R}$ to perform rate-distortion optimization (RDO). For example, a video encoder can generate the distortion prediction $\hat{D}$ and the bit rate residual prediction $\widehat{R_{res}}$ based on outputs of one or more neural networks in response to the one or more neural networks receiving a residual portion of a block of a video frame as input. The video encoder can determine bit rate metadata prediction $\widehat{R_{meta}}$ based on metadata associated with a mode of compression, and determine $\hat{R}$ to be the sum of $\widehat{R_{res}}$ and $\widehat{R_{meta}}$. The video encoder can determine a rate-distortion cost prediction $\hat{J}$ as a function of $\hat{D}$ and $\hat{R}$, and can determine a prediction mode for compressing the block based on $\hat{J}$.

In one example, an apparatus for data encoding is provided. The apparatus includes a memory and one or more processors (e.g., implemented in circuitry) coupled to the memory. The one or more processors are configured to and can: receive a residual portion of a block of a video frame of video data; determine a distortion prediction and a bit rate prediction based on one or more outputs of one or more neural networks (NNs) in response to the one or more NNs receiving the residual portion of the block as input; calculate a rate-distortion cost prediction as a function of the distortion prediction and the bit rate prediction; and determine, based on the rate-distortion cost prediction, a prediction mode for compressing the block.

In another example, a method of data encoding is provided. The method includes receiving a residual portion of a block of a video frame of video data. The method includes determining a distortion prediction and a bit rate prediction based on one or more outputs of one or more neural networks (NNs) in response to the one or more NNs receiving the residual portion of the block as input. The method includes calculating a rate-distortion cost prediction as a function of the distortion prediction and the bit rate prediction. The method includes determining, based on the rate-distortion cost prediction, a prediction mode for compressing the block.

In another example, a non-transitory computer-readable medium is provided that has stored thereon instructions that, when executed by one or more processors, cause the one or more processors to: receive a residual portion of a block of a video frame of video data; determine a distortion prediction and a bit rate prediction based on one or more outputs of one or more neural networks (NNs) in response to the one or more NNs receiving the residual portion of the block as input; calculate a rate-distortion cost prediction as a function of the distortion prediction and the bit rate prediction; and determine, based on the rate-distortion cost prediction, a prediction mode for compressing the block.

In another example, an apparatus for data encoding is provided. The apparatus includes means for receiving a residual portion of a block of a video frame of video data. The apparatus includes means for determining a distortion prediction and a bit rate prediction based on one or more outputs of one or more neural networks (NNs) in response to the one or more NNs receiving the residual portion of the block as input. The apparatus includes means for calculating a rate-distortion cost prediction as a function of the distortion prediction and the bit rate prediction. The apparatus includes means for determining, based on the rate-distortion cost prediction, a prediction mode for compressing the block.

In some aspects, the one or more NNs include a first neural network (NN) and a second NN, wherein determining the distortion prediction is based on a first output of the first NN in response to the first NN receiving the residual portion of the block as input, wherein determining the bit rate prediction is based on a second output of the second NN in response to the second NN receiving the residual portion of the block as input.

In some aspects, the one or more NNs include a neural network (NN), wherein determining the distortion prediction is based on a first output of the NN in response to the NN receiving the residual portion of the block as input, wherein determining the bit rate prediction is based on a second output of the NN in response to the NN receiving the residual portion of the block as input.

In some aspects, the methods, apparatuses, and computer-readable medium described above further comprise: receiving metadata associated with a compression mode for the block; determining a bit rate residual prediction based on the one or more outputs of one or more neural networks (NNs) in response to the one or more NNs receiving the residual portion of the block as input; and determining a bit rate metadata prediction based on an output of a rate estimation engine in response to the rate estimation engine receiving the metadata as input, wherein the bit rate prediction is a sum of the bit rate residual prediction and the bit rate metadata prediction. In some aspects, the function used to calculate the rate-distortion cost prediction is a sum of the distortion prediction and the bit rate prediction multiplied by a Lagrange multiplier. In some aspects, the compression mode is one of inter-frame compression and intra-frame compression.

In some aspects, the methods, apparatuses, and computer-readable medium described above further comprise: generating compressed video data by compressing the video data based on the prediction mode for compressing the block. In some aspects, the compressed video data is decodable using a decoder compliant with one or more video decoder standards.

In some aspects, the distortion prediction is determined in response to the one or more NNs receiving at least one of a quantization parameter (QP), a block size of the block, a compression mode, and information associated with the residual portion of the block. In some aspects, the bit rate prediction is determined in response to the one or more NNs receiving at least one of the QP, the block size of the block, the compression mode, and the information associated with the residual portion of the block. In some aspects, the methods, apparatuses, and computer-readable medium described above further comprise: determining the QP.

In some aspects, a block size of the block is one of 4 square pixels, 8 square pixels, 16 square pixels, 32 square pixels, 64 square pixels, and 128 square pixels.

In some aspects, the methods, apparatuses, and computer-readable medium described above further comprise: calculating a second rate-distortion cost prediction based on a modified variant of the block with a different block size; and selecting a block size for the block based on a minimum of the rate-distortion cost prediction and the second rate-distortion cost prediction. In some aspects, the methods, apparatuses, and computer-readable medium described above further comprise: calculating a second rate-distortion cost prediction based on a modified variant of the block with a different compression mode; and determining the prediction mode for compressing the block based on a minimum of the rate-distortion cost prediction and the second rate-distortion cost prediction.

In some aspects, the methods, apparatuses, and computer-readable medium described above further comprise: performing post-processing of the video data using the one or more NNs.

In some aspects, the one or more NNs include at least one of a convolutional neural network (CNN), a deep CNN, a neural network (NN) with fully connected layers, a CNN with fully connected layers, and a deep CNN with fully connected layers.

In some aspects, the apparatus comprises a camera that captures the video data. In some aspects, the apparatus comprises a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications associated with processing of the image, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
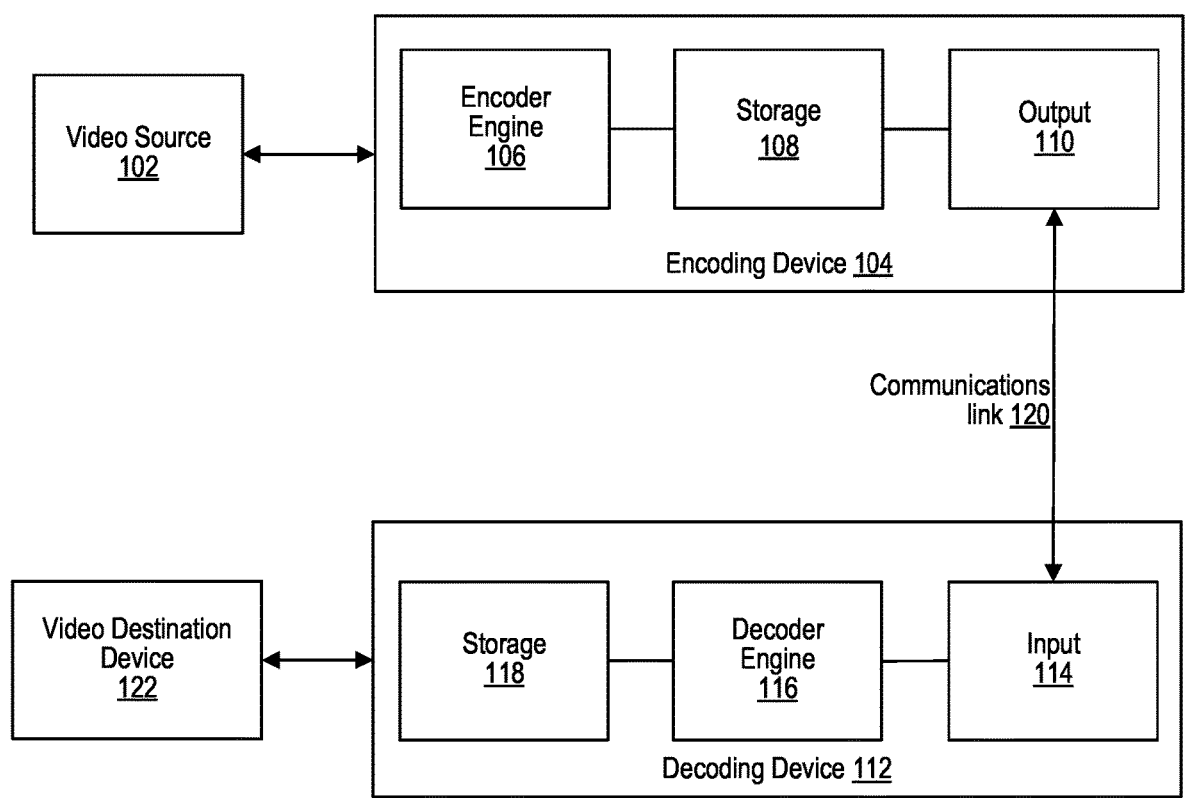
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and directs the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position. A video may refer to a sequence of consecutive images, which may be referred to as "video frames." Displaying a video refers to displaying the video frames of the video sequentially. A video may depict one or more objects in motion.

Video compression refers to compression of video data. Video compression includes both intra-frame compression and inter-frame compression. Intra-frame compression, also known as spatial compression, refers to compression of individual video frames using still image compression techniques. Inter-frame compression, also known as temporal compression, refers to compression of multiple video frames by identifying which regions of neighboring video frames include changes, and which regions of neighboring video frames include redundancies. Redundancies can be found where regions remain largely unchanged. For example, a video depicting a person moving in front of a largely static background can include redundancies between video frames in regions of the video frames depicting the background. Additionally, inter-frame compression can also identify object movements between frames using motion estimation, and can use that information for further redundancy removal.

Video coding devices, including video encoders and video decoders, implement video compression techniques to encode and decode video data. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (CU), described in greater detail below. These video blocks may be encoded using a particular prediction mode.

Coding of video data can include partitioning a video frame into coding blocks. For example, a quadtree structure can be used for partitioning video frames, which can include largest coding units (LCUs), coding tree units (CTUs), or the like, and sub-blocks thereof (e.g., coding units (CUs), prediction units (PU), transform units (TU), among others). References generally to a "block," unless otherwise specified, may refer to such video blocks (e.g., coding tree blocks, coding blocks, prediction blocks, transform blocks, or other appropriate blocks or sub-blocks. As used herein, a LCU refers to the largest coding unit according to a particular coding standard. Examples of LCUs include macroblocks, CTUs, among other coding units.

A prediction block can be generated for a current coding block using either inter-frame prediction or intra-frame prediction. The prediction block includes a coding block that is found to closely match the current coding block. For inter-frame prediction modes, the prediction block may be located in another temporal location, referred to as a reference frame or a reference picture. The video encoder may restrict the search for the prediction block to a certain spatial displacement from the block to be encoded, for instance based on a two-dimensional (2D) motion vector that includes a horizontal displacement component, a vertical displacement component, or a combination of both. For intra-frame prediction modes, a video encoder may form the predicted block using spatial prediction techniques based on data from previously encoded neighboring blocks within the same picture.

A residual coding block can be generated by subtracting the prediction block from the current coding block. The residual video data in the residual coding block may be included in one or more TUs. A transform and quantization engine can then transform the residual video data into residual transform coefficients using a transform, such as a discrete cosine transform (DCT), a discrete sine transform (DST), a discrete Fourier transform (DFT), a discrete Hartley transform (DHT), a similar transform, or a combination thereof. Transform coefficients resulting from the transform can be quantized to further reduce the bit rate (R). The degree of quantization, and therefore the bit rate R, may be based on a quantization parameter (QP), which can control how much spatial detail is retained from the captured image after quantization.

A video decoder may, using the syntax elements and control information discussed above, construct predictive data (e.g., a prediction block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is referred to as the distortion (D), or as the reconstruction error.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AOMedia Video 1 (AV1), and/or other video coding standard in development or to be developed.

Block partitioning, also referred to as CU partitioning, refers to partitioning of a video frame or other image into blocks or CUs. These blocks may be squares of varying sizes (e.g., 128×128 pixels, 64×64 pixels, 32×32 pixels, 16×16 pixels, 8×8 pixels) for use in performing both intra-frame and inter-frame compression. Different block sizes may be optimal depending on a variety of factors, such as whether the region of the image that is to be partitioned is flat and simple (e.g., depicting a plain wall or a clear blue sky) or more complex (e.g., depicting edges and/or textures). Optimizing the partitioning of video frames can provide better coding performance, allowing less distortion D for a video encoded at a given bit rate R.

A video encoder may perform rate-distortion optimization (RDO) to optimize the partitioning of video frames by identifying optimized partitions. However, RDO is very computationally expensive. In particular, calculating distortion D and bit rate R are both computationally expensive, and RDO entails determining distortion D and bit rate R repeatedly at both multiple compression modes and multiple block sizes. Encoders can estimate RDO using sum of absolute differences (SAD) or sum of absolute transformed differences (SATD) techniques as discussed further herein. However, estimating RDO using SAD or SATD severely reduces compression quality. In some examples, bit rates in videos compressed using SAD/SATD are approximately 20% higher than the same videos compressed using RDO at the same video quality.

As described in more detail below, systems and techniques are described herein for using artificial intelligence to generate a predicted distortion $\hat{D}$ that predicts the distortion D and to generate a predicted bit rate $\hat{R}$ that predicts the bit rate R. The systems and techniques are used to perform RDO using the predicted distortion $\hat{D}$ and the predicted bit rate $\hat{R}$. The artificial intelligence may include one or more machine learning models, one or more neural networks, one or more other artificial intelligence engines, or a combination thereof. Performing RDO using the predicted distortion $\hat{D}$ and the predicted bit rate $\hat{R}$ can be significantly faster and more efficient than performing RDO using the distortion D and the bit rate R, with similar optimization of video compression compared to performing RDO using the distortion D and the bit rate R. Performing RDO using the predicted distortion $\hat{D}$ and the predicted bit rate $\hat{R}$ can produce significantly more optimized video compression compared to estimating RDO using SAD/SATD, with similar speed and efficiency compared to estimating RDO using SAD/SATD.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model). A new video coding standard developed by JVET is known as Versatile Video Coding (VVC). VVC may be referred to as H.266, MPEG-I Part 3, or Future Video Coding.

HEVC was finalized by the Joint Collaboration Team on Video Coding (JCT-VC) of ITU-T Video Coding Experts Group (VCEG) and ISO/IEC Motion Picture Experts Group (MPEG) in 2013. The Joint Video Experts Team (JVET), a collaborative team formed by MPEG and ITU-T Study Group 16's VCEG, finalized the new VVC video coding standard in 2020. VVC provides a significant improvement in compression performance over the existing HEVC standard, aiding in deployment of higher-quality video services and emerging applications (e.g., such as 365° omnidirectional immersive multimedia, high-dynamic-range (HDR) video, among others).

Many embodiments described herein provide examples using the JEM model, VVC, the HEVC standard, and/or extensions thereof. However, as noted above, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard. Likewise, while some of the techniques and systems described herein may be described with reference to video and image encoding and decoding, one of ordinary skill in the art will appreciate that the description may also apply to data encoding and data decoding for other types of data than video data and/or image data, such as audio data, text data, or multimedia data.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x, \Delta y$), with $\Delta x$ specifying the horizontal displacement and $\Delta y$ specifying the vertical displacement of the reference block relative to the position of the current block. In some cases, a motion vector ($\Delta x, \Delta y$) can be in integer sample accuracy (also referred to as integer accuracy), in which case the motion vector points to the integer-pel grid (or integer-pixel sampling grid) of the reference frame. In some cases, a motion vector ($\Delta x, \Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0, y_0, \text{refIdx}_0$ and $\Delta x_1, y_1, \text{refIdx}_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0, y_0, \text{refIdx}_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of details of the encoding device 104 is described herein with reference to the encoders 305, 400, 500, 600, 700, and 800 of FIGS. 3-8. An example of details of the decoding device 112 is described below with reference to the decoder 310 of FIG. 3. In some cases, an encoding device 104 can perform features discussed herein as performed by the decoding device 112, for instance to determine distortion D for the purposes of rate-distortion optimization (RDO).

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of details of the encoding device 104 is described herein with reference to the encoders 305, 400, 500, 600, 700, and 800 of FIGS. 3-8. An example of details of the decoding device 112 is described below with reference to the decoder 310 of FIG. 3. In some cases, an encoding device 104 can perform features discussed herein as performed by the decoding device 112, for instance to determine distortion D for the purposes of rate-distortion optimization (RDO).

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction. The candidates for both modes can be derived from spatial and/or temporal neighboring blocks.

In some examples, sample rate conversion can be applied to video data. Sample rate conversion can include resampling, downsampling, upsampling, interpolation, and/or other sample rate conversion techniques. For instance, interpolation can include piecewise constant interpolation, linear interpolation, polynomial interpolation, and spline interpolation, among other interpolation techniques. Resampling can include downsampling, upsampling, and/or a combination of downsampling and upsampling, or obtaining new samples at a different sampling rate.

In certain systems, motion prediction can be enhanced with an inter-prediction block merging technique to simplify block-wise motion data signaling. Interpolation tasks are used in such context due to the displacement of objects between pictures being independent of the pixel grid for the images. Fractional accuracy (e.g., estimating placement between pixels in images) can thus be used to more accurately capture motion. This fractional accuracy can allow inference of motion data from previously decoded blocks. For interpolation and fractional reference picture samples, high precision can improve filtering. Example systems can support motion vectors with quarter-pixel accuracy, one-eighth pixel accuracy, one-sixteenth pixel accuracy, or other such accuracy depending on the system. In some examples, luma and chroma components can have different fractional accuracy in the same system. Interpolation filters can be used to process images in this context. Additionally, multiple different interpolation filters can be used in different situations (e.g., based on motion vector values). Selecting between different interpolation filters that are available is referred to herein as interpolation filter switching.

Resampling refers to taking pixel values from one image and "resampling" the data from the pixel values to generate new pixel values for a new image. As described above, resampling can include downsampling, where pixel values from a higher resolution image are used to generate an image at a lower resolution, as well as upsampling, where pixel values from a lower resolution image are used to generate an image at a higher resolution. In the context of motion prediction described above, references images and current images with different sizes (e.g., resolutions) can be used to generate motion vectors and perform motion prediction. Resampling can be used in such situations to manage the scaling difference between the reference picture and the current picture. Additionally, when the reference and current pictures are not the same size, a filter can be indicated by a filter index that is suitable for interpolation filtering without resampling but not for interpolation filtering with reference picture resampling. In some image processing systems, for example, a smoothing filter used for interpolation can create poor results when used for reference picture resampling. Examples described herein improve the operation of decoding and encoding devices by identifying appropriate filter values, and generating improved encoding and decoding results during operations of the encoding and decoding devices. In one example, this improvement is implemented by identifying filter index information for a current block of the current picture and determining that a first picture size value of the current picture and a second picture size value of the reference picture are different (e.g., that reference picture resampling is used). In this context, the example performs a resampling process using a default filter index in place of a current filter index identified by the filter index information (e.g., without using the current filter index). Additional aspects of various examples are described below.

Figure 2:
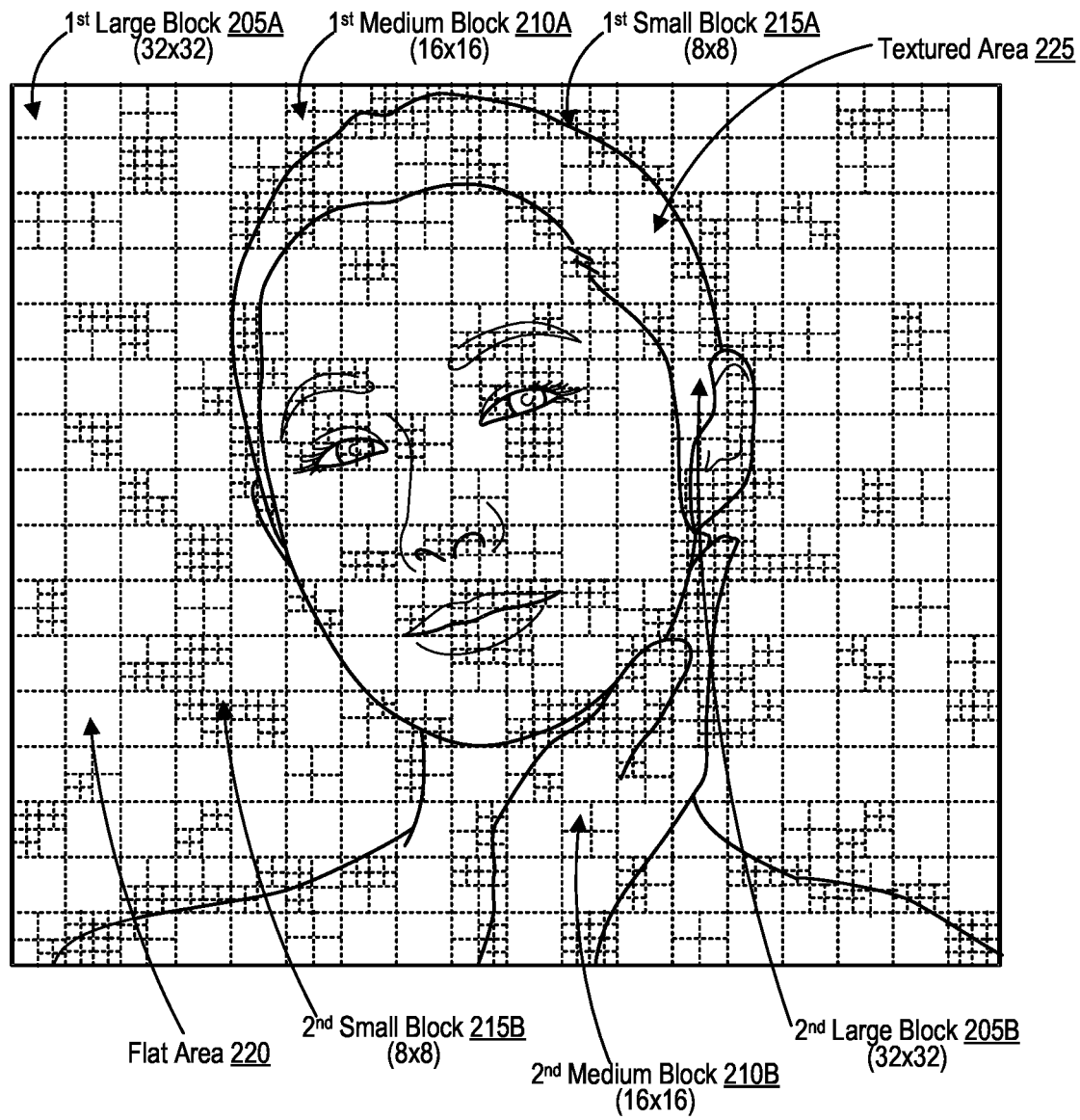
FIG. 2 is a conceptual diagram illustrating exemplary block partitioning of an image using rate-distortion optimization (RDO)

FIG. 2 is a conceptual diagram illustrating exemplary block partitioning 250 of an image 200 using rate-distortion optimization (RDO). The image 200 depicts a woman in the foreground in front of a relatively simple and flat white background. The image 200 can be a video frame of a video. A legend 290 illustrates a horizontal X axis and a vertical Y axis that is perpendicular to the horizontal X axis. The image 200 is illustrated on a plane spanning the X axis and the Y axis.

Some image and video encoding techniques support partitioning images and/or video frames into blocks or CUs. This process may be referred to as block partitioning or CU partitioning. These blocks may be squares of varying sizes, such as 128 square pixels (128×128 pixels), 64 square pixels (64×64 pixels), 32 square pixels (32×32 pixels), 16 square pixels (16×16 pixels), 8 square pixels (8×8 pixels), or 4 square pixels (4×4 pixels). Encoders may use these blocks for use in performing intra-frame and/or inter-frame compression. For example, High Efficiency Video Coding (HEVC) supports a largest coding unit (LCU) having a size of 64 square pixels, which can be partitioned into smaller CUs with sizes of 32 square pixels, 16 square pixels, or 8 square pixels. A video encoder that can accurately estimate quad-tree partitioning of the LCU can perform efficient compression of video data.

The exemplary block partitioning 250 of the image 200 illustrated in FIG. 2 produces blocks of various sizes. For example, a first large block 205A with a size of 32 square pixels is illustrated in the very top-left of the image. The first large block 205A is at the very top of the image 200 along the Y axis, and the very left of the image 200 along the X axis. The first large block 205A is positioned within a flat area 220 depicting the background behind the woman depicted in the image 200. The first large block 205A is positioned relatively far away from the depiction of the woman in the image 200. A first medium block 210A with a size of 16 square pixels is illustrated near the top of the image 200 along the Y axis, to the left of the horizontal center along the X axis of the image 200. The first medium block 210A is positioned within a flat area 220 depicting the background behind the woman depicted in the image 200. The first medium block 210A is close to the depiction of the woman in the image 200, as the next block to the right of the first medium block 210A along the X axis depicts an edge between the background and a portion of the woman's hair. A first small block 215A with a size of 8 square pixels is illustrated near the top of the image 200 along the Y axis, to the right of the horizontal center along the X axis of the image 200. The first small block 215A depicts an edge between the background and a portion of the woman's hair. The woman's hair is a textured area 225.

In some cases, smaller block sizes (e.g., 16×16, 8×8, 4×4) are best used in areas of an image or video frame that are more complex, such as those depicting edges of objects or textured content. Hence, the first small block 215A depicts an edge between a flat area 220 (the background) and a textured area 225 (the woman's hair). The first medium block 210A is positioned near a similar edge. On the other hand, larger block sizes (e.g., 128×128, 64×64, 32×32, 16×16) are in some cases best used in areas of an image or video frame that are relatively simple and/or flat, and/or that lack complexities such as textures and/or edges. Hence, the first large block 205A depicts a flat area 220 (the background). The first medium block 210A likewise depicts a flat area 220 (the background), despite being positioned near an edge between the flat area 220 (the background) and a textured area 225 (the woman's hair). While use of larger block sizes to encode flat areas and smaller block sizes to encode complex areas is often optimal, RDO reveals that this is not always true.

Complexity of depicted content in an area of an image or video frame is not a reliable indicator of optimal block size for block partitioning. RDO reveals that, in some cases, a larger block size (e.g., 128×128, 64×64, 32×32, 16×16) may be optimal in an area of the image 200 that is complex, such as the textured area 225. For example, the second large block 205B depicts both the textured area 225 (the woman's hair) and several edges, including an edge between the textured area 225 (the woman's hair) and the woman's face, an edge textured area 225 (the woman's hair) and the woman's ear, and several edges depicting different parts of the woman's ear. Likewise, RDO reveals that, in some cases, a smaller block size (e.g., 16×16, 8×8, 4×4) may be optimal in an area of the image 200 that is flat and simple and lacks complexities. For example, the second small block 205B depicts the flat area 220 (the background) and is positioned relatively far away from the depiction of the woman in the image 200.

The second medium block 210B depicts a relatively flat and simple area of skin on the hand of the woman in the image 200.

Because of this inconsistency, optimization of block partitioning 250 of an image 200 is a complex problem. Optimizing block partitioning 250 of video frames increases the Bjontegaard rate difference (BD-rate) for the compression of video that includes the video frames. Compression of the video using optimized block partitioning 250 can reduce bit rate R while maintaining the same video quality (e.g., the same distortion D) relative to the same video compressed without optimized block partitioning 250. Similarly, compression of the video using optimized black partitioning 250 can increase video quality (e.g., reduce the distortion D) while maintaining the same bit rate R relative to the same video compressed without optimized block partitioning 250.

Some video codecs can support a greater variety of block sizes than more traditional video codecs. For instance, some video codecs may support the 128×128 block size and/or the 4×4 block size, which more traditional video codecs do not support. In addition, some video codecs can support oblong rectangular blocks. Oblong rectangular blocks are rectangular but not square. For example, rectangular block sizes may include blocks having the dimensions N×M. N and M can each be, for example 4 pixels, 8 pixels, 16 pixels, 32 pixels, 64 pixels, 128 pixels, more than 128 pixels, or a number of pixels between any of the previously-listed numbers of pixels. In square block sizes, N=M. In oblong rectangular block sizes, N is distinct from M. While the increasing variety of block sizes supported by such codecs allows for greater video compression optimization, the increasing variety of block sizes also makes optimization of block partitioning 250 more difficult and computationally expensive to perform via RDO.

In some cases, the large blocks in the block partitioning 250, including the first large block 205A and the second large block 205B, may be examples of CTUs or LCUs. In some cases, the large blocks in the block partitioning 250 may be smaller than CTUs or LCUs and may be partitioned from CTUs or LCUs.

Figure 3:
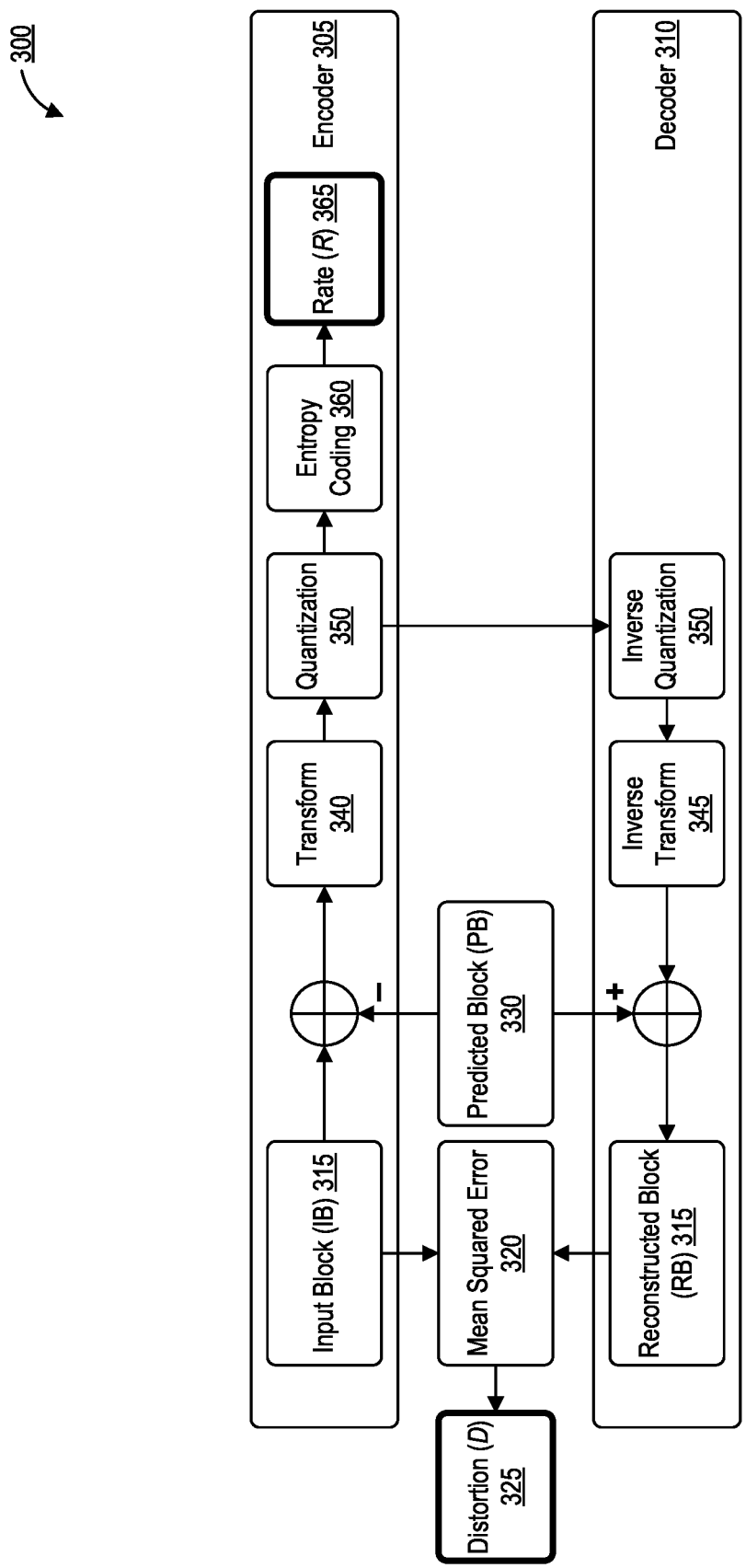
FIG. 3 is a conceptual diagram illustrating use of an encoder and a decoder to determine a bit rate R and a distortion D for use in rate distortion optimization (RDO)

FIG. 3 is a conceptual diagram 300 illustrating use of an encoder 305 and a decoder 310 to determine a bit rate R 365 and a distortion D 325 for use in rate distortion optimization (RDO). The conceptual diagram illustrates the encoder 305 and the decoder 310. The encoder 305 receives an input block (IB) 315. In some examples, the input block 315 may be a largest coding unit (LCU) or a coding tree unit (CTU), or a sub-block thereof (e.g., a coding unit (CU), a prediction unit (PU), a transform unit (TU)). The encoder 305 identifies a prediction block (PB) 330 corresponding to the input block 315 using inter-frame prediction and/or intra-frame prediction. The prediction block 330 is a coding block that is found to closely match the input block 315. For inter-frame prediction modes, the prediction block 330 may be located in another temporal location than the frame with the input block 315. The other temporal location may be a previous video frame before the frame with the input block 315. The previous video frame may be referred to as a reference frame. The video encoder may restrict the search for the prediction block to a certain spatial displacement from the input block 315, for instance based on a two-dimensional (2D) motion vector that includes a horizontal displacement component along an X-axis and a vertical displacement component along a Y-axis. For intra-frame prediction modes, the encoder 305 may form the predicted block 330 using spatial prediction based on data from previously encoded neighboring blocks within the video frame that includes the input block 315.

The encoder 305 subtracts the prediction block 330 from the input block 315 to produce a residual coding block. The encoder 305 inputs the residual coding block into a transform and quantization engine of the encoder 305, which performs a transform 340 and a quantization 350. In the transform 340, the transform and quantization engine of the encoder 305 transforms the residual coding block into residual transform coefficients using a transform, such as a discrete cosine transform (DCT), a modified discrete cosine transform (MDCT), a discrete sine transform (DST), a fast Fourier transform (FFT), a wavelet transform, or a combination thereof. The transform 340 can be a lossy compression scheme. In the quantization 350, the transform and quantization engine of the encoder 305 quantizes the residual transform coefficients, reducing the bit rate R 365. A degree of quantization performed by the transform and quantization engine of the encoder 305 during the quantization 350 can be based on a quantization parameter (QP), and can be modified by adjusting the QP. The QP indicates a quantization step size for a video frame during quantization, and controls how much spatial detail is retained from the captured image after quantization. As the QP decreases, more image detail is retained during compression, leading to an increase in video quality and an increase in bit rate R 365. As the QP increases, more of the image detail is aggregated during compression, leading to a decrease in video quality and a decrease in bit rate R 365. An entropy encoder of the encoder 305 performs entropy coding 360, thus generating the bit rate R 360. Entropy coding 360 can be a lossless data compression scheme. The entropy coding 360 may include, for example, context-adaptive binary arithmetic coding (CABAC), arithmetic coding, Golomb coding, Huffman coding, range coding, Shannon coding, Shannon-Fano coding, Shannon-Fano-Elias coding, Tunstall coding, unary coding, universal coding, or a combination thereof.

The decoder 310 can receive encoded video data encoded by the encoder 305. The decoder 310 can determine the prediction block 330 corresponding to the input block 315 based on syntax elements and control information in the encoded video data. The decoder 310 can include an inverse transform and inverse quantization engine. Based on the bit rate 365, the QP, and/or other information in and/or associated with the encoded video, the inverse transform and inverse quantization engine of the decoder 310 can perform an inverse quantization process 350 and an inverse transform process 345. The inverse quantization process 350 can generate reconstructed residual transform coefficients. The inverse transform process 345 receives the reconstructed residual transform coefficients and generates a reconstructed residual coding block. The decoder 310 adds the reconstructed residual coding block to the prediction block 330 to generate a reconstructed block (RB) 355.

The reconstructed block (RB) 355 generated by the decoder 310 can be compared to the input block 315 input into the encoder 305, for instance using a mean squared error (MSE) 320 comparison, which may be calculated as $D=\Sigma_n (IB(n)-RB(n))^2$. The difference between the reconstructed block 355 and the input block 315 can be referred to as the distortion D 325. The distortion D 325 can be calculated by the encoder 305, the decoder 310, another device, or a combination thereof.

Figure 4:
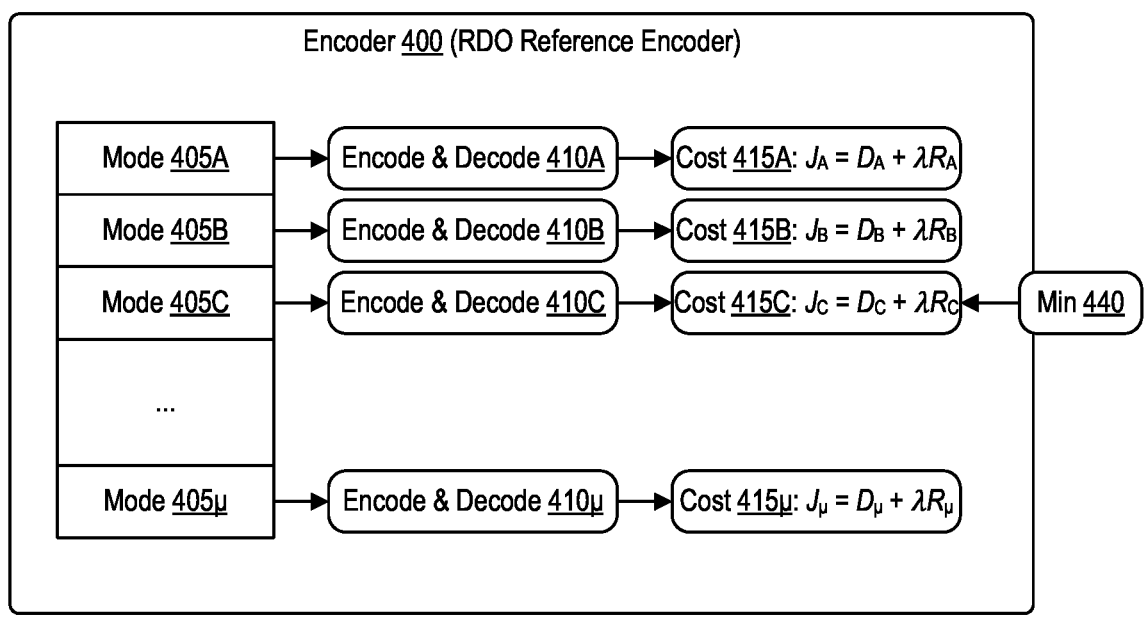
FIG. 4 is a conceptual diagram illustrating a rate distortion optimization (RDO) reference encoder that determines distortions D and bit rates R for different modes, and performs RDO based on the distortions D and bit rates R.

Determining the bit rate R 365 is a computationally expensive process, as the transform process 340 and the quantization process 350 are both computationally expensive. Entropy coding 360 may also be computationally expensive—for instance, context-adaptive binary arithmetic coding (CABAC) as used in in the HEVC/H.264 is computationally expensive. Determining the distortion D 325 is also a computationally expensive process, as the inverse quantization process 355, the inverse transform process 345, and the mean squared error 320 are each computationally expensive. The mean squared error 320, for instance, includes a square operation. Rate distortion optimization (RDO) involves performing multiple passes of encoding using an encoder 305 and decoding using a decoder 310. In particular, as illustrated in FIG. 4, RDO entails determining multiple different values for the bit rate R 365 and the distortion D 325 that each correspond a particular combination of compression mode (e.g., inter-frame or intra-frame), block sizes, and/or QP values. Thus, RDO entails performing the computationally expensive operations for determining the bit rate R 365 and for determining the distortion D 325 multiple times, further increasing computational resources and time required.

FIG. 4 is a conceptual diagram illustrating a rate distortion optimization (RDO) reference encoder 400 that determines distortions D and bit rates R for different modes 450A-μ, and performs RDO based on the distortions D and bit rates R. RDO can be used to find an optimal balance between minimizing distortion D and minimizing bit rate R. In some cases, RDO is used to minimize distortion D for a given bit rate R, for example to generate the highest quality video possible at a particular file size. In some cases, RDO is used to minimize bit rate R for a given distortion D, for example to generate the smallest file size possible for a particular video quality.

RDO entails performing multiple passes of encoding and decoding under different compression modes, block sizes, and QP values. Compression modes refer to inter-frame compression or intra-frame compression. For simplicity, different combinations of compression modes, block sizes, and QP values are referred to simply as different modes 405A-μ in FIG. 4. The RDO reference encoder 400 of FIG. 4, under the first mode 405A, performs an encode and a decode 410A, similarly to the encoding done by the encoder 305 and the decoding done by the decoder 310. The encoder 400, in performing the encode and decode 410A, produces a bit rate value $R_A$ corresponding to the first mode 405A and a distortion value $D_A$ corresponding to the first mode 405A. The encoder 400 determines a cost $J_A$ 415A corresponding to use of the first mode 405A by calculating $J_A=D_A+\lambda R_A$. Lamba (λ) represents a Lagrange multiplier. The encoder 400 performs a second encode and decode 410B under the second mode 405B, and determines a cost 415B $J_B=D_B+\lambda R_B$ under the second mode 405B. The encoder 400 performs a third encode and decode 410C under the third mode 405C, and determines a cost 415C $J_C=D_C+\lambda R_C$ under the third mode 405C. The encoder 400 performs one or more additional encode, decode, and cost calculations, until the encoder 400 reaches a final $\mu^{th}$ mode 405μ. The encoder 400 performs a final encode and decode 410μ under the $\mu^{th}$ mode 405μ, and determines a cost 415μ $J_\mu=D_\mu+\lambda R_\mu$ under the $\mu^{th}$ mode 405μ. In this example, p, can represent any number greater than 3. The encoder 400 calculates a minimum function to find the minimum 440 of the costs 415A-μ, which can be written as $\min(J_A, J_B, J_C, \ldots J_\mu)$. In the example of FIG. 4, the encoder 400 determines that the third cost $J_C$ 415C corresponding to the third mode 405C is the minimum 440 of the costs 415A-μ. Because the third cost $J_C$ 415C is the minimum 440, the encoder 400 concludes that the third mode 405C is optimal for encoding a current block of video data. A cost J may be referred to as a rate-distortion cost J.

As discussed with respect to FIG. 3, each encode and decode 410A-μ, is computationally extensive on its own. The RDO process performed by the encoder 400 in FIG. 4 performs numerous (μ) encode and decode 410A-μ, processes so that a minimum 440 of the costs 415A-μ, can be determined. The encoder 400 performs the RDO process illustrated in FIG. 4 for each block of each video frame of the video data. In some examples, each block may be a LCU or a CTU, or a sub-block thereof (e.g., a CU, a PU, a TU). As a result, the computationally expensive RDO process is performed numerous times for each video, increasing the computational expense further.

A block to be encoded under one of the modes 405A-μ, may be slightly modified compared to a block to be encoded under a different one of the modes 405A-μ. Thus, the block to be encoded under one of the modes 405A-μ, may be referred to as a modified variant of a block to be encoded under a different one of the modes 405A-μ.

Figure 5:
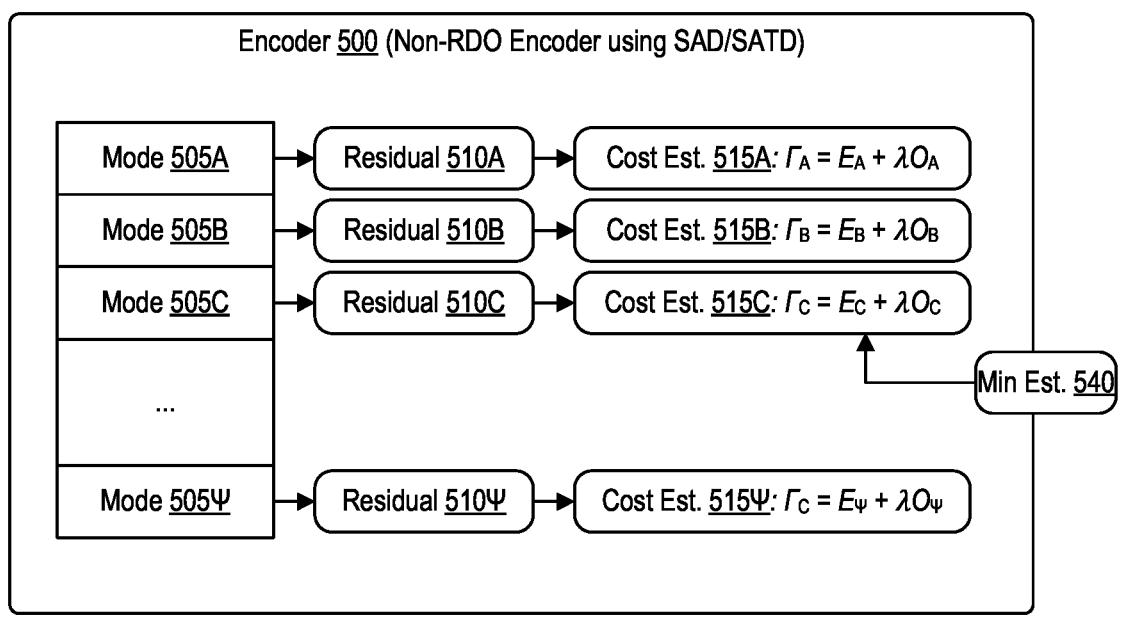
FIG. 5 is a conceptual diagram illustrating an encoder that determines a sum of absolute differences (SAD), a sum of absolute transformed differences (SATD), and/or a simplified bit rate estimate to estimate rate distortion optimization (RDO) in place of performing true RDO.

FIG. 5 is a conceptual diagram illustrating an encoder 500 that determines a sum of absolute differences (SAD), a sum of absolute transformed differences (SATD), and/or a simplified bit rate estimate to estimate rate distortion optimization (RDO) in place of performing true RDO. Because RDO produces highly optimized compression but is computationally expensive, the encoder 500 estimates RDO to increase efficiency instead of performing the true RDO calculation. One technique to estimate RDO is to estimate distortion D by instead calculating a simplified distortion estimate E and/or to estimate bit rate R by instead calculating a simplified bit rate estimate O. This RDO estimation technique is used by the encoder 500. The encoder 500 may be referred to as a non-RDO encoder, since the technique it performs is distinct from RDO.

The SAD and SATD are two measures of similarity between blocks that are faster and less computationally expensive to perform than the mean squared error (MSE) 320 calculation of FIG. 3. SATD is more computationally expensive than SAD, and can be more accurate than SAD in some cases. SATD is still generally less computationally expensive than MSE 320. Thus, some encoders may replace the MSE 320 operation of FIG. 3 with SAD or SATD to output an estimate of the distortion D. In addition, some encoders can simply perform a SAD or a SATD based on the input block 310 and the prediction block 330 as an estimate of the distortion D. Similarly, some encoders, like the encoder 500, can perform a SAD or a SATD based on the residual of the input block 310 and the prediction block 330 as an estimate of the distortion D. Either process reduces computational expense further, as computationally expensive steps such as the transform 340, quantization 350, inverse quantization 350, inverse transform 345, and generation of the reconstructed block 315 are skipped. However, this reduces the accuracy of the estimate even further. The output of such a SAD or SATD operation can be referred to as a simplified distortion estimate E. Some encoders, like the encoder 500, use the simplified distortion estimate E as an estimate of the distortion D.

Similarly, the encoder 500 uses a simplified bit prediction algorithm to generate a simplified bit rate estimate O. For example, the simplified bit prediction algorithm of the encoder 500 can ignore actual entropy encoding (e.g., CABAC encoding) and instead use bit rate metadata as the simplified bit rate estimate O approximating R (e.g., similar to some aspects of the $\widetilde{R_{meta}}$ determination discussed further below). In some examples, the simplified bit prediction algorithm of the encoder 500 can compute the simplified bit rate estimate O based on number of non-zero coefficients. The simplified bit prediction algorithm may take the input block 315 and/or the predicted block 330 as inputs, and may skip the transform 340, the quantization 350, and/or the entropy coding 360. The simplified bit prediction algorithm can be less computationally expensive, but also less accurate, than the transform 340, the quantization 350, and/or the entropy coding 360. For example, because some entropy coders such as CABAC are computationally expensive, the encoder 500 can use of the simplified bit prediction algorithm and the simplified bit rate estimate 0 in place of the true bit rate R in order to avoid using CABAC or other computationally expensive entropy coders.

Like the encoder 400, the encoder 500 performs multiple passes of generating a cost estimate Γ under different compression modes, block sizes, and QP values. Similarly to the modes 405A-μ, in FIG. 4, these different combinations of compression modes, block sizes, and QP values are referred to simply as different modes 505A-Ψ in FIG. 5. The encoder 500 generates a cost estimate Γ by calculating Γ=E+λO. The cost estimate Γ can be considered a simplified estimate of the cost J for a given mode. The encoder 500 of FIG. 5, under the first mode 505A, determines a residual 510A between an input block and a prediction block. Based on the residual 510A, the encoder 500 determines a simplified distortion estimate $E_A$ corresponding to the first mode 505A and a simplified bit rate estimate $O_A$ corresponding to the first mode 505A. The encoder 500 determines a cost estimate $Γ_A$ 515A corresponding to use of the first mode 505A by calculating $Γ_A=E_A+\lambda O_A$. The encoder 500 determines a second residual 510B under the second mode 505B, and determines a cost estimate 515B $Γ_B=E_B+\lambda O_B$ under the second mode 505B based on the second residual 510B. The encoder 500 determines a third residual 510C under the third mode 505C, and determines a cost estimate 515C $Γ_C=E_C+\lambda O_C$ under the third mode 505C based on the third residual 510C. The encoder 500 performs one or more residual, simplified distortion estimate E, simplified bit rate estimate O, and cost estimate Γ calculations, until the encoder 500 finally reaches a final $Ψ^{th}$ mode 505Ψ. The encoder 500 determines a final $Ψ^{th}$ residual 510Ψ under the $Ψ^{th}$ mode 505Ψ, and determines a cost estimate 515Ψ $Γ_Ψ=E_Ψ++\lambda O_Ψ$ under the $Ψ^{th}$ mode 505Ψ based on the $Ψ^{th}$ residual 510Ψ. In this example, Ψ can represent any number greater than 3. The encoder 500 calculates a minimum function to find the minimum 540 of the cost estimates 515A-Ψ, which can be written as min($Γ_A, Γ_B, Γ_C, \ldots Γ_Ψ$). In the example of FIG. 5, the encoder 500 determines that the third cost estimate Fc 515C corresponding to the third mode 505C is the minimum 540 of the costs 515A-Ψ. Because the third cost estimate Fc 515C is the minimum 540, the encoder 500 concludes that the third mode 505C is optimal for encoding a current block of video data. The minimum 540 can be referred to as a minimum estimate 540 or as a simplified minimum estimate 540, since it estimates the minimum 440 determined by the encoder 400. A cost estimate Γ can be referred to as a simplified cost estimate Γ, a rate-distortion cost estimate Γ, a simplified rate-distortion cost estimate Γ, or simply as a cost Γ.

By finding the minimum estimate 540 and determining that the third mode 505C corresponds to the minimum estimate 540, the encoder 500 estimates RDO. The encoder 500 estimating RDO using the simplified distortion estimate E and the simplified bit rate estimate O is less computationally expensive to run than the encoder 400 that performs true RDO. However, the encoder 500 that estimates RDO using the simplified distortion estimate E and the simplified bit rate estimate O produces severely reduced compression quality compared to the encoder 400 that performs true RDO. In some examples, bit rates in videos compressed the non-RDO encoder 500 increased by approximately 20% with the same video quality compared to compression of the same videos using the RDO encoder 400.

Figure 6:
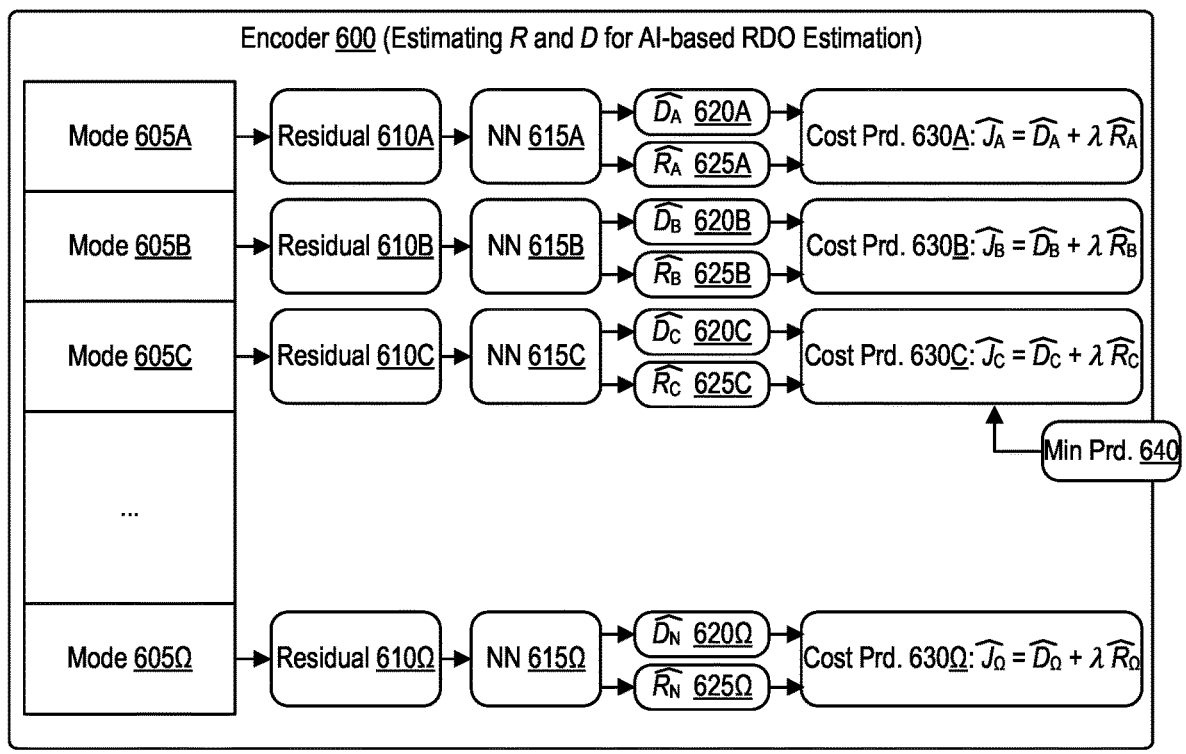
FIG. 6 is a conceptual diagram illustrating an encoder that uses one or more neural networks to determine predicted distortions $\hat{D}$ and predicted bit rates $\hat{R}$ for different modes, and performs RDO based on the predicted distortions $\hat{D}$ and predicted bit rates $\hat{R}$.

FIG. 6 is a conceptual diagram illustrating an encoder 600 that uses one or more neural networks 615A-Ω to determine predicted distortions $\hat{D}$ and predicted bit rates $\hat{R}$ for different modes, and performs RDO based on the predicted distortions $\hat{D}$ and predicted bit rates $\hat{R}$. The encoder 600 may be referred to as an AI-based encoder, a ML-based encoder, or a NN-based encoder. Similarly to the non-RDO encoder 500, the NN-based encoder 600 calculates residuals 610A-Ω for the modes 605A-Ω. The encoder 600 uses one or more neural networks (NNs) 615A-Ω to generate an accurate prediction of distortion D, referred to as the distortion prediction $\hat{D}$. The encoder 600 uses one or more neural networks (NNs) 615A-Ω to generate an accurate prediction of bit rate R, referred to as the bit rate prediction $\hat{R}$. The one or more NNs 615A-Ω of the encoder 600 may generate the distortion prediction $\hat{D}$ for a given mode of the modes 605A-Ω based on the residual of the residuals 610A-Ω that corresponds to the given mode. The one or more NNs 615A-Ω of the encoder 600 may generate the bit rate prediction $\hat{R}$, or at least a component thereof (e.g., $\widehat{R_{res}}$ as discussed below), for a given mode of the modes 605A-Ω based on the residual of the residuals 610A-Ω that corresponds to the given mode. Based on the distortion prediction $\hat{D}$ and the bit rate prediction $\hat{R}$ the encoder 600 can generate accurate predictions of costs $J_A$ 415A through $J_\mu$ 415μ, referred to as cost predictions $\hat{J}_A$ 630A through $\hat{J}_A$ 630Ω. The encoder 600 determines the cost prediction $\hat{J}$ using the equation $\hat{J}=\hat{D}+\hat{R}$.

Like the RDO encoder 400 and the non-RDO encoder 500, the NN-based encoder 600 performs multiple passes of generating a cost prediction $\hat{J}$ under different compression modes, block sizes, and QP values. Similarly to the modes 405A-μ in FIG. 4, these different combinations of compression modes, block sizes, and QP values are referred to simply as different modes 605A-Ω in FIG. 6. The encoder 600 generates a cost prediction $\hat{J}$ by calculating $\hat{J}=\hat{D}+\lambda\hat{R}$. The cost estimate $\hat{J}$ can be considered a prediction of the cost J for a given mode. The encoder 600 of FIG. 6, under the first mode 605A, determines a residual 610A between an input block and a prediction block. Based on the residual 610A, the encoder 600 determines a distortion prediction $\widehat{D_A}$ 620A corresponding to the first mode 605A and a bit rate prediction $\widehat{R_A}$ 625A corresponding to the first mode 605A. The encoder 600 determines a cost estimate $\widehat{J_A}$ 630A corresponding to use of the first mode 605A by calculating $\widehat{J_A}=\widehat{D_A}+\lambda\widehat{R_A}$. The encoder 600 determines a second residual 610B under the second mode 605B, determines the distortion prediction $\widehat{D_B}$ 620B and the bit rate prediction $\widehat{R_B}$ 625B based on the second residual 610B, and determines a cost estimate 630B $\widehat{J_B}=\widehat{D_B}+\lambda\widehat{R_B}$ under the second mode 605B. The encoder 600 determines a third residual 610C under the third mode 605C, determines the distortion prediction $\widehat{D_C}$ 620C and the bit rate prediction $\widehat{R_C}$ 625C based on the third residual 610C, and determines a cost estimate 630C $\widehat{J_C}=\widehat{D_C}+\lambda\widehat{R_C}$ under the third mode 605C. The encoder 600 performs one or more residual, distortion prediction $\hat{D}$, bit rate prediction $\hat{R}$, and cost prediction $\hat{J}$ calculations, until the encoder 600 finally reaches a final $\Omega^{th}$ mode 605Ω. The encoder 600 determines a final $\Omega^{th}$ residual 610Ω under the $\Omega^{th}$ mode 605Ω, determines the distortion prediction $\widehat{D_\Omega}$ 620Ω and the bit rate prediction $\widehat{R_\Omega}$ 625Ω based on the $\Omega^{th}$ residual 610Ω, and determines a cost estimate 630Ω $\widehat{J_\Omega}=\widehat{D_\Omega}+\lambda\widehat{R_\Omega}$ under the $\Omega^{th}$ mode 605Ω. In this example, Ω can represent any number greater than 3. The encoder 600 calculates a minimum function to find the minimum 640 of the cost predictions 630A-Ω, which can be written as min($\widehat{J_A}$, $\widehat{J_B}$, $\widehat{J_\Omega}$, ... $\widehat{J_\Omega}$). In the example of FIG. 6, the encoder 600 determines that the third cost prediction $\widehat{J_\Omega}$ 630C corresponding to the third mode 605C is the minimum 640 of the costs 630A-12. Because the third cost estimate $\widehat{J_\Omega}$ 630C is the minimum 640, the encoder 600 concludes that the third mode 605C is optimal for encoding a current block of video data. The minimum 640 can be referred to as a minimum prediction 640, since it predicts the minimum 440 determined by the encoder 400. A cost prediction $\hat{J}$ can be referred to as a rate-distortion cost prediction $\hat{J}$, as a rate-distortion prediction cost $\hat{J}$, as a rate-distortion prediction cost $\hat{J}$, or simply as a cost $\hat{J}$.

Figure 7:
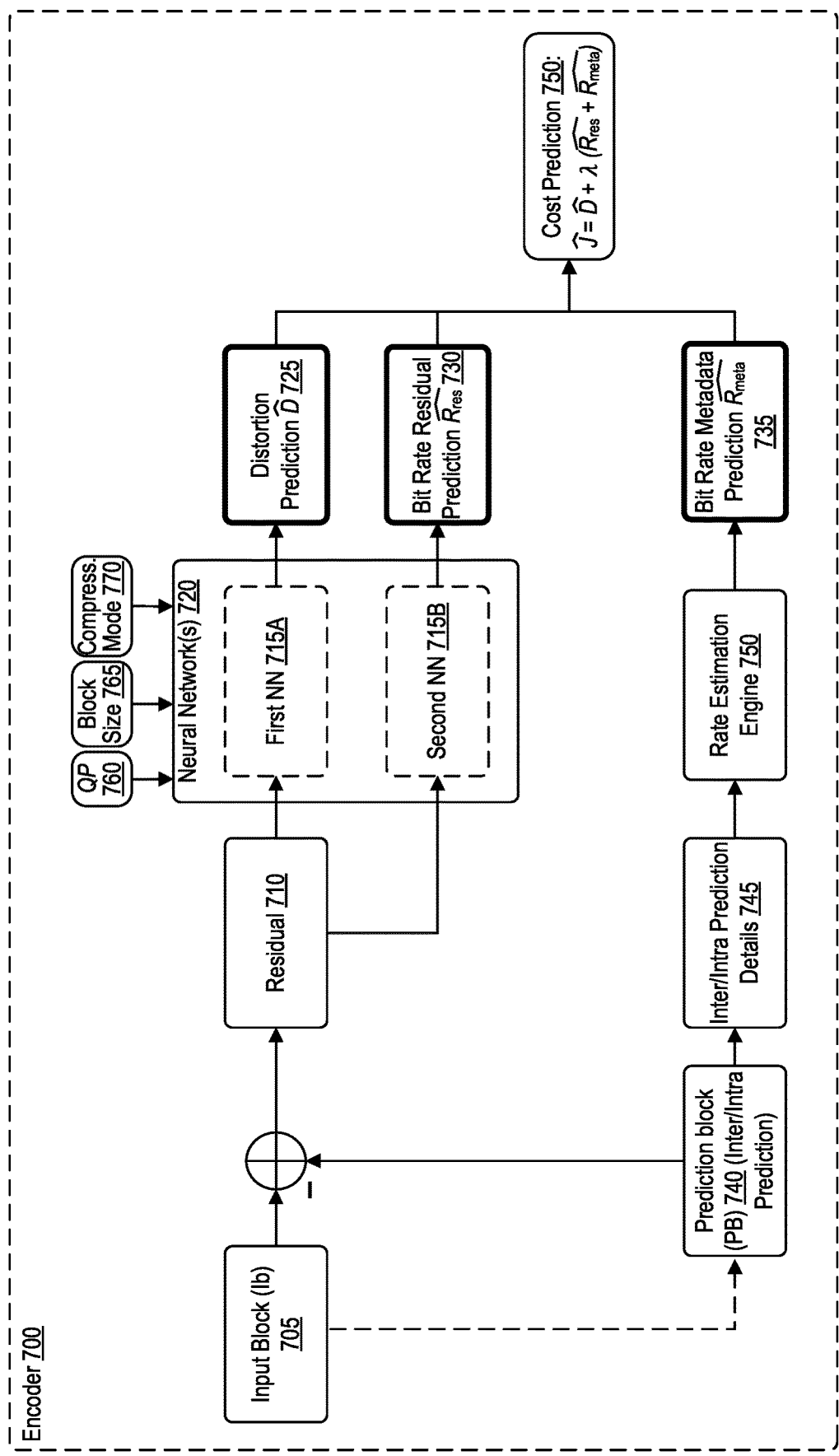
FIG. 7 is a conceptual diagram illustrating an encoder that determines a cost prediction $\hat{J}$ for an input block by determining a sum of a predicted distortion $\hat{D}$, a predicted residual bit rate $\widetilde{R_{res}}$, and a predicted meta bit rate $\widetilde{R_{meta}}$.

The encoder 600 is illustrated with a different NN of the NNs 615A for each mode. In some examples, different NNs may be used for different modes so that the encoder 600 can determine distortion predictions $\hat{D}$ 620A-Ω, bit rate predictions $\hat{R}$ 625A-Ω, and/or cost predictions $\hat{J}$ 630A-Ω for the different modes 605A-Ω in parallel. In some examples, a single set of one or more NNs can be used to determine multiple distortion predictions $\hat{D}$ 620A-Ω, multiple bit rate predictions $\hat{R}$ 625A-Ω, and/or multiple cost predictions $\hat{J}$ 630A-Ω for the different modes 605A-Ω. In some examples, for each mode of the modes 605A-Ω, a first NN is used to determine the distortion predictions $\hat{D}$ 620A-Ω, while a second NN is used to determine the bit rate predictions $\hat{R}$ 625A-Ω. An example of an encoder 700 that uses a first NN 715A and a second NN 715B in this way is illustrated in FIG. 7. In some examples, a single NN is used to determine both the distortion predictions $\hat{D}$ 620A-Ω and the bit rate predictions $\hat{R}$ 625A-Ω.

In some examples, as illustrated in and discussed further with respect to FIG. 7, the bit rate prediction R is a sum of intermediate bit rate prediction values $\widehat{R_{res}}$ and $\widehat{R_{meta}}$. The encoder 600's calculation of the bit rate prediction $\hat{R}$ can be expressed as $\hat{R}=\widehat{R_{res}}+\widehat{R_{meta}}$. $\widehat{R_{res}}$ may be referred to as a bit rate residual prediction. $\widehat{R_{meta}}$ may be referred to as a bit rate metadata prediction. In some examples, the encoder 600 can determine the bit rate residual prediction $\widehat{R_{res}}$ based on the one or more outputs of one or more neural networks (NNs) 615A-Ω in response to the one or more NNs 615A-Ω receiving, as input, a residual of the residuals 610A-Ω corresponding to the mode of the modes 605A-Ω. In some examples, the encoder 600 can determine the bit rate metadata prediction $\widehat{R_{meta}}$ based on an output of a rate estimation engine 750 in response to the rate estimation engine receiving the metadata as input. The metadata can be associated with the particular mode of compression (e.g., intra-frame or inter-frame).

Use of the one or more NNs 615A-Ω grants additional flexibility to the NN-based encoder 600. For example, the same neural network hardware (the one or more NNs 615A-Ω) can be used for video post-processing for additional video quality gains. For example, during video decoding flows, the decoded output can be further processed for additional video quality gains, for example by reducing ringing/blocking artifacts, improving error handling, producing higher frame rate video (e.g., through frame interpolation), adjusting brightness, adjusting contrast, adjusting color saturation, adjusting color mapping, adjusting tone mapping, adjusting other image properties, performing red eye correction, performing gaze correction, performing skin blemish correction, or combinations thereof.

The one or more NNs 615A-Ω discussed herein may be a convolutional neural network (CNN), a deep CNN, a NN with fully connected layers, a CNN with fully connected layers, a deep CNN with fully connected layers, another type of NN, or a combination thereof. In some cases, the one or more NNs 615A-Ω may be supplemented by, or replaced by, one or more machine learning (ML) models, one or more artificial intelligence (AI) engines, or a combination thereof.

The distortion prediction $\hat{D}$ determined by the encoder 600 for a given mode can be significantly more accurate (e.g., closer to the value of D) than the simplified distortion estimate E determined by the encoder 500 for the same mode, and can be computed in a comparable time with comparable computing expense. The bit rate prediction $\hat{R}$ determined by the encoder 600 for a given mode can be significantly more accurate (e.g., closer to the value of R) than the simplified bit rate estimate O determined by the encoder 500 for the same mode, and can be computed in a comparable time with comparable computing expense. The cost prediction $\hat{J}$ determined by the encoder 600 for a given mode can be significantly more accurate (e.g., closer to the value of J) than the cost estimate Γ determined by the encoder 500 for the same mode, and can be computed in a comparable time with comparable computing expense. The minimum prediction 640 determined by the encoder 600 for a given mode is significantly more accurate (e.g., closer to the value of the minimum 440) than the minimum estimate 540 determined by the encoder 500 for the same mode, and can be computed in a comparable time with comparable computing expense. In some examples, compression of a video using RDO by the RDO encoder 400 at a peak signal to noise ratio (PSNR) of 38.5 dB achieves a 7.9 Mbps bit rate. In some examples, compression of the same video using RDO estimation by the non-RDO encoder 500 at PSNR=38.5 dB achieves an 11 Mbps bit rate, which amounts to a significant 28% bitrate reduction compared to use of RDO by the RDO encoder 400. In some examples, compression of the same video using the RDO prediction by the NN-based encoder 600 at PSNR=38.5 dB achieves an 8.4 Mbps bit rate, which amounts to only a small 6% bitrate reduction compared to use of RDO by the RDO encoder 400. This example illustrates that the NN-based encoder 600 improves on the non-RDO encoder 500 significantly in compression optimization.

FIG. 7 is a conceptual diagram illustrating an encoder 700 that determines a cost prediction $\hat{J}$ 750 for an input block 705 by determining a function of a distortion prediction $\hat{D}$ 725, a bit rate residual prediction $\widehat{R_{res}}$ 730, and a bit rate metadata prediction $\widehat{R_{meta}}$ 735. The encoder 700 receives an input block (IB) 705. In some examples, the input block 705 is a LCU or a CTU, or a sub-block thereof (e.g., a CU, a PU, a TU). The encoder 700 identifies a prediction block (PB) 740 corresponding to the input block 705 using inter-frame prediction and/or intra-frame prediction. The encoder 700 subtracts the prediction block 740 from the input block 705 to produce a residual coding block, identified in FIG. 7 as the residual 710. The encoder 700 inputs the residual 710 into one or more NNs 720. The one or more NNs 720 receive as inputs the residual 710 corresponding to the input block 705, a quantization parameter (QP), a block size corresponding to the input block 705, and a compression mode (e.g., intra-frame compression or inter-frame compression), and in some cases other types of information. Based on the information input into the one or more NNs 720, the one or more NNs 720 generate the distortion prediction $\hat{D}$ 725 and the bit rate residual prediction $\widehat{R_{res}}$ 730.

The one or more NNs 720 can include a first NN 715A and a second NN 715B. The first NN 715A and the second NN 715B can receive the same inputs, as discussed with respect to the inputs received by the one or more NNs 720. The first NN 715A and the second NN 715B can receive different subsets of the inputs discussed as being received by the one or more NNs 720. In some examples, the first NN 715A generates the distortion prediction $\hat{D}$ 725 in response to receipt of its inputs (e.g., residual 710, QP 760, block size 765, compression mode 770, or a combination thereof). In some examples, the second NN 715B generates the bit rate residual prediction $\widehat{R_{res}}$ 730 in response to receipt of its inputs (e.g., residual 710, QP 760, block size 765, compression mode 770, or a combination thereof). In some examples, the one or more NNs 720 output one or more intermediate values, which the encode 700r formats, converts, arithmetically adjusts, and/or otherwise processes to generate the distortion prediction $\hat{D}$ 725 and the bit rate residual prediction $\widehat{R_{res}}$ 730.

The encoder 700 can determine inter/intra prediction details 745, such as details of intra-frame or inter-frame prediction, based on the prediction block 740 and/or the process by which the encoder 700 identified the prediction block 740. The inter/intra prediction details 745 can include, for example, the block size, decisions on how to split the CTU into CUs, inter prediction information, intra prediction information, or a combination thereof. For instance, if the block has a relatively large block size, such as 32×32, then $\widehat{R_{meta}}$ 735 can be small. If the block is broken down into smaller sizes, then $\widehat{R_{meta}}$ 735 can be larger. Intra prediction information can include whether the intra mode is part of the most probable mode (MPM) or not. Inter prediction information can include information as to inter-frame coding and merging, and can include a size of a motion vector difference (MVD). A rate estimation engine 750 of the encoder 700 can receive the inter/intra prediction details 745 as an input, and can output the bit rate metadata prediction $\widehat{R_{meta}}$ 735. For instance, the rate estimation engine 750 can generate the bit rate metadata prediction $\widehat{R_{res}}$ 735 based on the inter/intra prediction details 745 by including the inter/intra prediction details 745 as part of the bit rate metadata prediction $\widehat{R_{meta}}$ 735. In some examples, the rate estimation engine 750 outputs one or more intermediate values, which the encoder 700 formats, converts, arithmetically adjusts, and/or otherwise processes to generate the bit rate metadata prediction $\widehat{R_{meta}}$ 735.

The encoder 700 determines a cost prediction $\hat{J}$ 750 once the encoder 700 has determined the distortion prediction $\hat{D}$ 725, the bit rate residual prediction $\widehat{R_{res}}$ 730, and the bit rate metadata prediction $\widehat{R_{meta}}$ 735. The encoder 700 determines a cost prediction $\hat{J}$ 750 as a function of the distortion prediction $\hat{D}$ 725, the bit rate residual prediction $\widetilde{R_{res}}$ 730, and the bit rate metadata prediction $\widetilde{R_{meta}}$ 735. In some examples, the encoder 700 determines a cost prediction $\hat{J}$ 750 using the function $\hat{J}=\hat{D}+\lambda(\widetilde{R_{res}}+\widetilde{R_{meta}})$.

Figure 8:
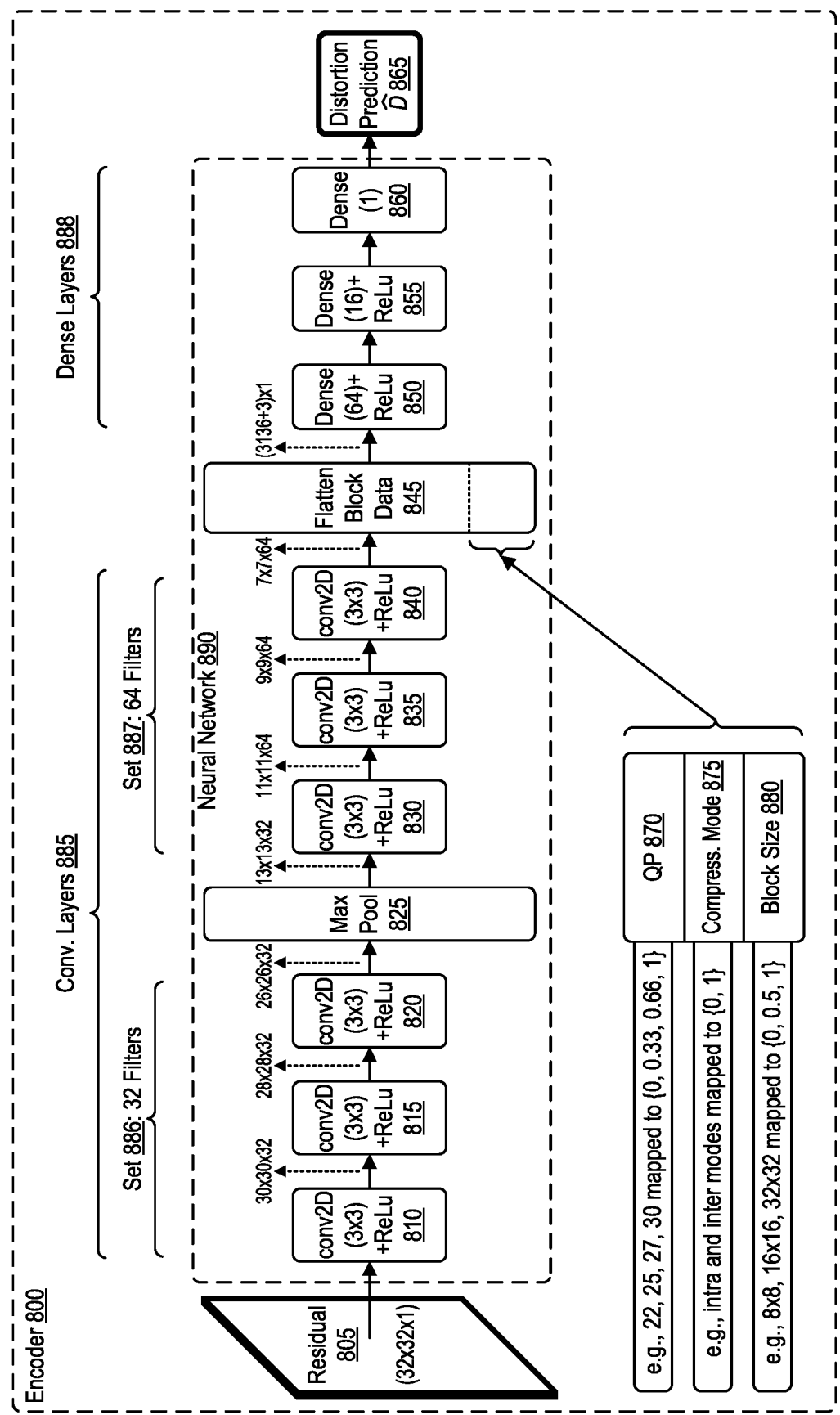
FIG. 8 is a conceptual diagram illustrating a neural network (NN) that determines a predicted distortion $\hat{D}$ for a particular residual associated with a particular input block.

FIG. 8 is a conceptual diagram illustrating a neural network (NN) 890 that determines a distortion prediction $\hat{D}$ 865 for a particular residual 805 associated with a particular input block. The NN 890 of the encoder 800 of FIG. 8 may be at least one of a convolutional neural network (CNN), a deep CNN, a neural network (NN) with fully connected layers, a CNN with fully connected layers, a deep CNN with fully connected layers, another type of NN, or a combination thereof. The NN 890 may include a set of convolutional layers (e.g., a set of convolutional layers 885), a set of fully connected layers, one or more non-linear activation layers (e.g., one or more Rectified Linear Units or ReLUs), and/or other neural network layers.

The NN 890 receives the residual 805, which may have dimensions of 32 pixels along an X axis (e.g., see legend 290), 32 pixels along a Y axis, and 1 pixel along a Z axis perpendicular to the X axis and the Y axis (representing depth). The NN 890 may also receive the QP 870, the compression mode 875 (e.g., intra-frame or inter-frame), and the block size 880.

As noted above, the NN 890 may include a set of convolutional layers 885. The set of convolutional layers 885 shown in FIG. 8 includes a first set of convolutional layers 886. In one illustrative example, the first set of convolutional layers 886 may include 32 convolutional filters. The first set of convolutional layers 886 may include, for instance, a first 3×3 two-dimensional convolutional layer (conv2D) 810, a second 3×3 conv2D 815, and a third 3×3 conv2D 815. The first set of convolutional layer 886 may reduce the dimensionality of the feature space. For example, in FIG. 8, the output of the first 3×3 conv2D 810 has dimensions of 30×30×32, the output of the second 3×3 conv2D 815 has dimensions of 28×28×32, and the output of the third 3×3 conv2D 820 has dimensions of 26×26×32. The output of each layer may be the input of the following layer. A non-linear activation function (such as a Rectified Linear Unit, or ReLU) may again be applied to the output of each of the convolutional layers.

The set of convolutional layers 885 may include a max-pooling layer 825 following the first set of convolutional layers 886 and preceding a second set of convolutional layers 887. The output of the first set of convolutional layers 886 may serve as the input of the max-pooling layer 825. The max-pooling layer 825 can compute a maximum value over each receptive field rather than performing a convolution. The max-pooling layer 825 can effectively downsample the output of the first set of convolutional layers 886, reducing the number of operations required for all the following layers.

The set of convolutional layers 885 may include the second set of convolutional layers 887 following the max-pooling layer 825. The output of the max-pooling layer 825 may serve as the input for the second convolutional layer 887. The second set of convolutional layers 887 may include, for example, 64 convolutional filters. The second set of convolutional layers 887 may include, for instance, a fourth 3×3 conv2D 830, a fifth 3×3 conv2D 835, and a sixth 3×3 conv2D 840. The second set of convolutional layers 887 may reduce the dimensionality of the feature space further. For example, in FIG. 8, the output of the fourth 3×3 conv2D 830 has dimensions of 13×13×32, the output of the fifth 3×3 conv2D 835 has dimensions of 11×11×64, and the output of the sixth 3×3 conv2D 840 has dimensions of 7×7×64. The output of each layer may be the input of the following layer. A non-linear activation function (such as a ReLU) may again be applied to the output of each of the convolutional layers.

The NN 890 may flatten the output of the second set of convolutional layers 887 into a one-dimensional (1D) vector using a flatten block data operation 845. Data corresponding to the QP 870, compression mode 875, and block size 880 may be appended onto the flattened 1D vector. An example of the QP 870 data is illustrated, indicating that 22, 25, 27, 30 are mapped to {0, 0.33, 0.66, 1}. An example of the compression mode 875 data is illustrated, indicating that intra-frame and inter-frame modes are mapped to {0, 1}. An example of the block size 880 data is illustrated, indicating that 8×8, 16×16, 32×32 are mapped to {0, 0.5, 1}. In some cases, the data corresponding to the QP 870, compression mode 875, and block size 880 may be input into the NN 890 earlier or later than this operation. Before the data corresponding to the QP 870, compression mode 875, and block size 880 are appended, the flattened vector has dimensions of 3136×1. After the data corresponding to the QP 870, compression mode 875, and block size 880 are appended, the flattened vector has dimensions of 3139×1, where 3139=3136+3. The 3 corresponding to the three appended parameters corresponding to the QP 870, compression mode 875, and block size 880.

The NN 890 may pass the vector output by the flatten block data operation 845 to a set of dense layers 888, which may generate the distortion prediction $\hat{D}$ 865. Dense layers may also be referred to as fully connected layers. Each dense layer may perform a linear operation on the vector input to the dense layer. The set of dense layers 888 may include, for example, a first dense layer 850, a second dense layer 855, and a third dense layer 860. The output of each dense layer of the set of dense layer 888 may be the input of the following dense layer of the set of dense layer 888. A non-linear activation function (such as a ReLU) may be applied to the output of the first dense layer 850 and to the output of the second dense layer 855.

The NN 890 may be trained using training data generated using an encoder 400 performing RDO (e.g., as performed by the RDO encoder 400) given different residuals 805 and given different QPs, block sizes and the compression modes. The NN 890 may be trained until any training and testing errors are output by the NN 890 are reduced to reach to a minimum accuracy level. Weights corresponding to the least error are used by the NN 890 to generate distortion prediction $\hat{D}$ 865 and/or bit rate residual prediction $\widetilde{R_{res}}$ and/or a weighted combination of the distortion prediction $\hat{D}$ 865 and the bit rate residual prediction $\widetilde{R_{res}}$. More specifically, the NN 890 may be trained to generate the distortion prediction $\hat{D}$ 865 based on training data of the RDO encoder 400 generating the multiple different distortion $\hat{D}$ values for many different residuals 805 under different QPs, block sizes and the compression modes. Similarly, the NN 890, or a second NN, may be trained to generate the bit rate residual prediction $\widetilde{R_{res}}$ based on training data of the RDO encoder 400 generating the multiple different bit rate R values for many different residuals 805 under different QPs, block sizes and the compression modes. In some cases, the NN 890, or the second NN, may be trained to generate the bit rate residual prediction $\widetilde{R_{res}}$ also based on different values for the bit rate metadata prediction $\widetilde{R_{meta}}$ output by the bit rate estimation engine 735 for the same residuals 805, QPs, block sizes and the compression modes input into the RDO encoder 400 to generate the bit rate R values for the training data.

In some examples, video data encoded using the encoder 600, the encoder 700, or the encoder 800 may be decodable using a decoder that is compliant with one or more video encoding and decoding standards (e.g., HEVC, VVC, MPEG, AVC, or other standard). In some examples, video data encoded using the encoder 600, the encoder 700, or the encoder 800 does not require a specialized decoder to decode.

Figure 9:
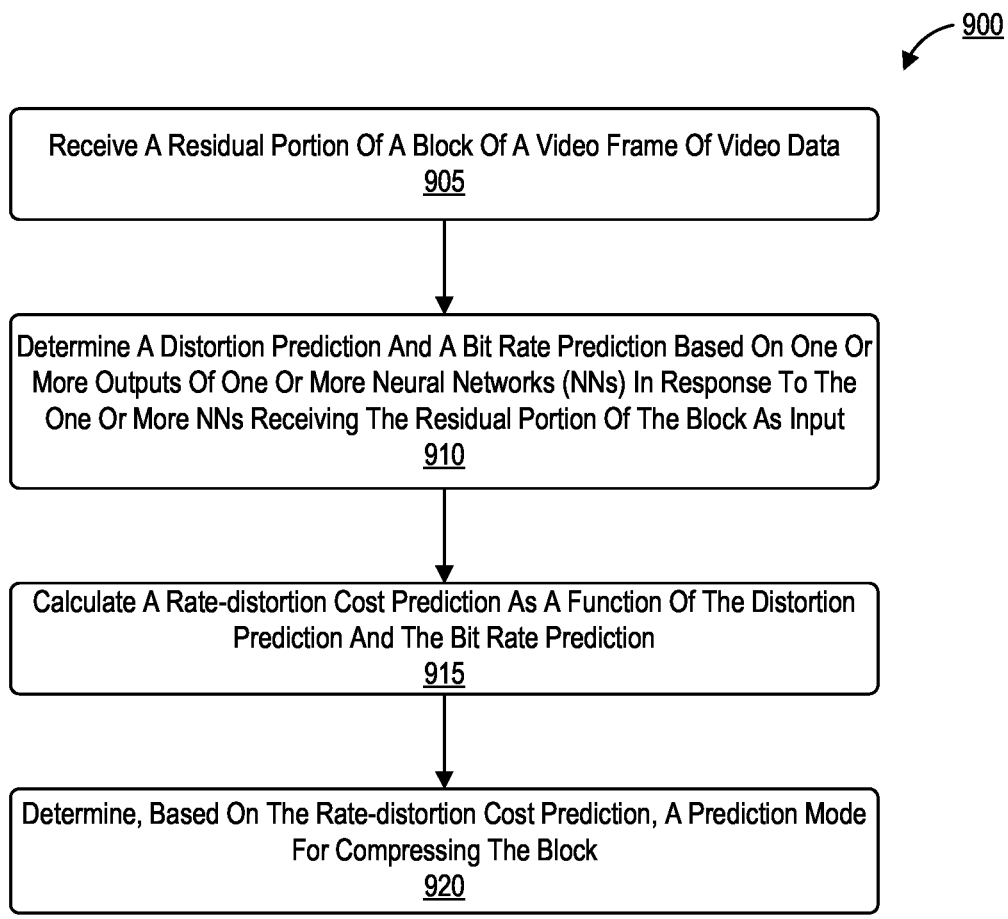
FIG. 9 is a flow diagram illustrating a data encoding technique.

FIG. 9 is a flow diagram illustrating a data encoding technique 900. The data encoding technique 900 illustrated by the flow diagram of FIG. 9 may be performed by a device. The device may be an encoding device 104, a decoding device 112, an encoder 305, a decoder 310, an encoder 400, an encoder 500, an encoder 600, an encoder 700, one or more neural networks 720, a rate estimation engine 750, an encoder 800, a neural network 890, an image capture device, a video capture device, an image processing device, a video processing device, an image capture and processing device, a video capture and processing device, one or more network servers of a cloud service, a computing system 1000, or some combination thereof.

At operation 905, the device receives a residual portion of a block of a video frame of video data. A block size of the block may be 4 square pixels, 8 square pixels, 16 square pixels, 32 square pixels, 64 square pixels, 128 square pixels, more than 128 square pixels, or a value in between any of the previously listed values. The block may have a first side with a length of 4 pixels, 8 pixels, 16 pixels, 32 pixels, 64 pixels, 128 pixels, more than 128 pixels, or a value in between any of the previously listed values. The block may have a second side with a length of 4 pixels, 8 pixels, 16 pixels, 32 pixels, 64 pixels, 128 pixels, more than 128 pixels, or a value in between any of the previously listed values. The image 200 of FIG. 2 is an example of the video frame of video data of operation 905. The blocks 205A, 205B, 210A, 210B, 215A, and 215B of FIG. 2 are each examples of the block of the video frame of operation 905. The image 200 of FIG. 2 may be a residual frame. The residual portion of a block of a video frame of video data can be received from a video source 102 as in FIG. 1, for example. The residual data 510A-510Ψ of FIG. 5 are examples of the residual portion of a block of a video frame of video data of operation 905. The residual data 610A-610Ω of FIG. 6 are examples of the residual portion of a block of a video frame of video data of operation 905. The residual data 710 of FIG. 7 is an example of the residual portion of a block of a video frame of video data of operation 905. The residual data 805 of FIG. 8 is an example of the residual portion of a block of a video frame of video data of operation 905.

At operation 910, the device determines a distortion prediction $\hat{D}$ and a bit rate prediction $\hat{R}$ based on one or more outputs of one or more neural networks (NNs) in response to the one or more NNs receiving the residual portion of the block as input. The one or more NNs can include at least one of a convolutional neural network (CNN), a deep CNN, a neural network (NN) with fully connected layers, a CNN with fully connected layers, a deep CNN with fully connected layers, or a combination thereof. The distortion predictions $\hat{D}_A$ 620A through $\hat{D}_\chi$ 620Ω of FIG. 6 are examples of the distortion prediction $\hat{D}$ of operation 910. The bit rate predictions $\hat{R}_A$ 625A through $\hat{R}_\chi$ 625Ω of FIG. 6 are examples of the bit rate prediction $\hat{R}$ of operation 910. The neural networks $NN_A$ 615A through $NN_\Omega$ 615Ω of FIG. 6 are examples of the one or more neural networks (NNs) of operation 910. The distortion prediction $\hat{D}$ 725 of FIG. 7 is an example of the distortion prediction $\hat{D}$ of operation 910. The bit rate residual prediction $\widetilde{R_{res}}$ 730 of FIG. 7 is an example of the bit rate prediction $\hat{R}$ of operation 910. A sum of the bit rate residual prediction $\widetilde{R_{res}}$ 730 and the bit rate metadata prediction $\widetilde{R_{meta}}$ 735 of FIG. 7 is an example of the bit rate prediction $\hat{R}$ of operation 910. The neural network(s) 720 of FIG. 7 are examples of the one or more neural networks (NNs) of operation 910. The distortion prediction $\hat{D}$ 865 of FIG. 8 is an example of the distortion prediction $\hat{D}$ of operation 910. The neural network 890 of FIG. 8 is an example of the one or more neural networks (NNs) of operation 910.

In some examples, the one or more NNs include a first neural network (NN) and a second NN. Determining the distortion prediction is based on a first output of the first NN in response to the first NN receiving the residual portion of the block as input, while determining the bit rate prediction is based on a second output of the second NN in response to the second NN receiving the residual portion of the block as input. The first NN 715A of FIG. 7 is an example of the first NN. The second NN 715B of FIG. 7 is an example of the second NN.

In some examples, the one or more NNs include a neural network (NN). Determining the distortion prediction is based on a first output of the NN in response to the NN receiving the residual portion of the block as input, while determining the bit rate prediction is based on a second output of the same NN in response to the NN receiving the residual portion of the block as input. For example, a single NN can be used to determine both the distortion predictions and bit rate predictions. The neural networks $NN_A$ 615A through $NN_\Omega$ 615Ω of FIG. 6 and the neural network(s) 720 of FIG. 7 are examples of the one or more neural networks (NNs).

The distortion prediction can be determined in response to the one or more NNs receiving at least one of a quantization parameter (QP), a block size of the block, a compression mode, information associated with the residual portion of the block, or a combination thereof. The bit rate prediction can be determined in response to the one or more NNs receiving at least one of the QP, the block size of the block, the compression mode, the information associated with the residual portion of the block, or a combination thereof. The device may further determine the QP. For example, the neural network(s) 720 of FIG. 7 use a QP 760, block size 765, and/or compression mode 770 to generate the distortion prediction $\hat{D}$ 725 and the bit rate residual prediction $\widetilde{R_{res}}$ 730 of FIG. 7. Similarly, the neural network 890 of FIG. 8 uses a QP 870, block size 880, and/or a compression mode 875 to generate the distortion prediction $\hat{D}$ 865 of FIG. 8 and/or a bit rate residual prediction $\widetilde{R_{res}}$ (not shown).

In some examples, the device can receive metadata associated with a compression mode for the block. The compression mode can be inter-frame compression or intra-frame compression. The device can determine a bit rate residual prediction based on the one or more outputs of one or more neural networks (NNs) in response to the one or more NNs receiving the residual portion of the block as input. The device can determine a bit rate metadata prediction based on an output of a rate estimation engine in response to the rate estimation engine receiving the metadata as input. The bit rate prediction can be a sum of the bit rate residual prediction and the bit rate metadata prediction. The function used to calculate the rate-distortion cost prediction can be a sum of the distortion prediction and the bit rate prediction multiplied by a Lagrange multiplier. For example, the sum of the bit rate residual prediction $\widehat{R_{res}}$ 730 and the bit rate metadata prediction $\widehat{R_{meta}}$ 735 of FIG. 7 (as shown in the cost prediction 750 of FIG. 7) is an example of the bit rate prediction $\hat{R}$ of operation 910. Examples of the Lagrange multiplier λ are discussed with respect to the costs 415A-415μ of FIG. 4, the cost estimates 515A-515Ψ of FIG. 5, the cost predictions 630A-630Ω of FIG. 6, and the cost prediction 750 of FIG. 7.

At operation 915, the device calculates a rate-distortion cost prediction $\hat{J}$ as a function of the distortion prediction $\hat{D}$ and the bit rate prediction $\hat{R}$. The cost predictions 630A-630Ω of FIG. 6 are examples of the rate-distortion cost prediction $\hat{J}$ of operation 915. The cost prediction 750 of FIG. 7 is an example of the rate-distortion cost prediction $\hat{J}$ of operation 915.

At operation 920, the device determines, based on the rate-distortion cost prediction $\hat{J}$, a prediction mode for compressing the block. For instance, the mode 605C that corresponds to the minimum prediction 640 (the cost prediction $\widehat{J_C}$ 630C) of FIG. 6 is an example of the prediction mode for compressing the block of operation 920. In some cases, the device may generate compressed video data by compressing the video data based on the prediction mode for compressing the block. The device can also generate compressed video data by compressing the video data based on the prediction mode for compressing the block. The compressed video data may be sent from an encoding device 104 to a decoding device 112 along a communications link 120 as in FIG. 1. The compressed video data may be sent from an encoder 305 to a decoder 310 as in FIG. 3. The compressed video data can be decodable using a decoder compliant with one or more video decoder standards, such as any of the CODEC standards identified herein, any of the video decoder standards identified herein, any video decoder standards associated with any of the video encoder standards identified herein, or combinations thereof. The decoding device 112 and/or the decoder 310 are examples of such a decoder. The device can also perform post-processing of the video data using the one or more NNs.

In some examples, the device also calculates a second rate-distortion cost prediction based on a modified variant of the block with a different block size. In such examples, the device can select a block size for the block based on a minimum of the rate-distortion cost prediction and the second rate-distortion cost prediction. In some examples, the device also calculates a second rate-distortion cost prediction based on a modified variant of the block with a different compression mode. In such examples, the device can determine the prediction mode for compressing the block based on a minimum of the rate-distortion cost prediction and the second rate-distortion cost prediction. Two of the cost predictions 630A-630Ω of FIG. 6 can be examples of the rate-distortion cost prediction and the second rate-distortion cost prediction, respectively. The minimum prediction 640 of FIG. 6 is an example of the minimum of the rate-distortion cost prediction and the second rate-distortion cost prediction. For instance, the cost prediction $\widehat{J_C}$ 630C of FIG. 6 can be an example of either the rate-distortion cost prediction or the second rate-distortion cost prediction. The different modes 605A-605Ω of FIG. 6 can be examples of the different block sizes for the block, of the different compression modes for the block, or a combination thereof.

In some cases, at least a subset of the data encoding technique 900 illustrated by the flow diagram of FIG. 9 and the techniques illustrated in the conceptual diagrams of FIGS. 1, 3, 4, 5, 6, 7, and 8, may be performed remotely by one or more network servers of a cloud service. In some examples, the processes described herein (e.g., the data encoding technique 900, the and the techniques illustrated in the conceptual diagrams of FIGS. 1, 3, 4, 5, 6, 7, and 8, and/or other processes described herein) may be performed by a computing system or apparatus. In some example, the data encoding technique 900 and/or the techniques illustrated in the conceptual diagrams of FIGS. 1, 3, 4, 5, 6, 7, and 8 can be performed by one or more of an encoding device 104, a decoding device 112, an encoder 305, a decoder 310, an encoder 400, an encoder 500, an encoder 600, an encoder 700, one or more neural networks 720, a rate estimation engine 750, an encoder 800, a neural network 890, an image capture device, a video capture device, an image processing device, a video processing device, an image capture and processing device, a video capture and processing device, one or more network servers of a cloud service, a computing system 1000, or some combination thereof. The data encoding technique 900 and/or the techniques illustrated in the conceptual diagrams of FIGS. 1, 3, 4, 5, 6, 7, and 8 can be performed by a computing system with the architecture of the computing system 1000 shown in FIG. 10. The computing system can include any suitable device, such as a mobile device (e.g., a mobile phone), a desktop computing system, a tablet computing system, a wearable device (e.g., aVR headset, an AR headset, AR glasses, a network-connected watch or smartwatch, or other wearable device), a camera device, a server computer, a vehicle or computing system of a vehicle, a robotic device, a television, and/or any other computing system with the resource capabilities to perform the processes described herein, including the data encoding technique 900 and/or the techniques illustrated in the conceptual diagrams of FIGS. 1, 3, 4, 5, 6, 7, and 8. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams of FIGS. 1, 3, 4, 5, 6, 7, and 8, and flow diagram of FIG. 9, are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams of FIGS. 1, 3, 4, 5, 6, 7, and 8, and flow diagram of FIG. 9 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
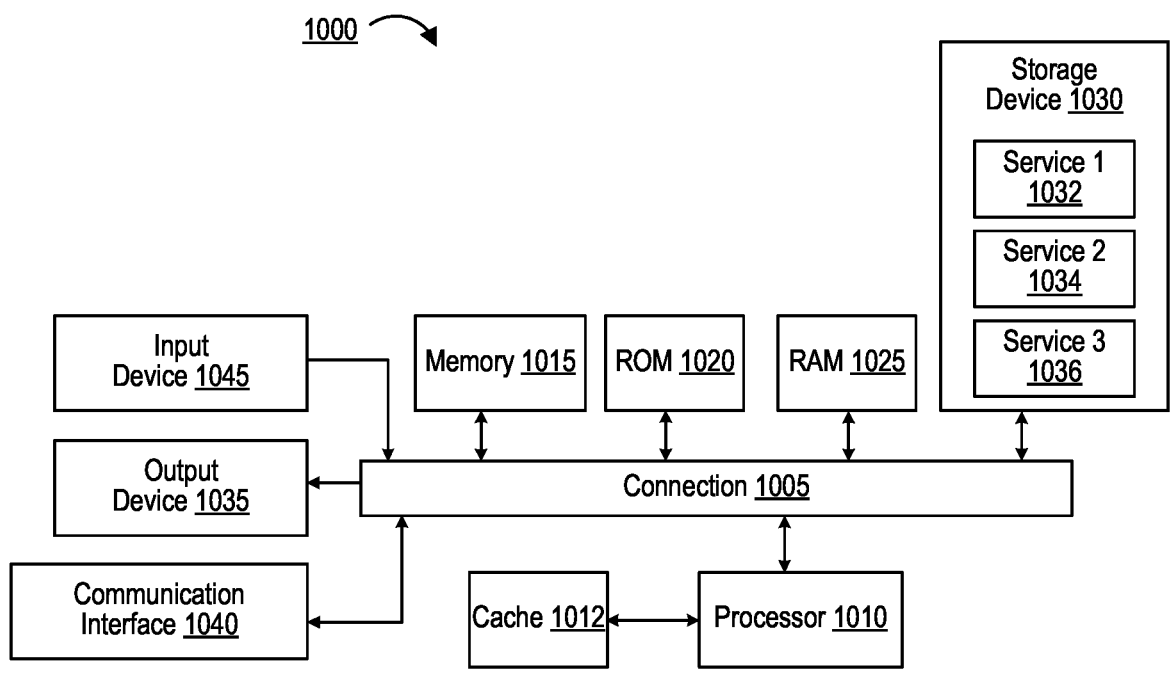
FIG. 10 is a diagram illustrating an example of a system for implementing certain aspects of the present technology.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for data encoding, the apparatus comprising: a memory; and one or more processors coupled to the memory, the one or more processors configured to: receive a residual portion of a block of a video frame of video data; determine a distortion prediction and a bit rate prediction based on one or more outputs of one or more neural networks (NNs) in response to the one or more NNs receiving the residual portion of the block as input; calculate a rate-distortion cost prediction as a function of the distortion prediction and the bit rate prediction; and determine, based on the rate-distortion cost prediction, a prediction mode for compressing the block.

Aspect 2: The apparatus of Aspect 1, wherein the apparatus is one of a mobile device, a wireless communication device, and a camera device.

Aspect 3: The apparatus of any one of Aspects 1 to 2, wherein the apparatus includes a camera, wherein the video data is captured by the camera.

Aspect 4: The apparatus of any one of Aspects 1 to 3, wherein the one or more NNs include a first neural network (NN) and a second NN, wherein determining the distortion prediction is based on a first output of the first NN in response to the first NN receiving the residual portion of the block as input, wherein determining the bit rate prediction is based on a second output of the second NN in response to the second NN receiving the residual portion of the block as input.

Aspect 5: The apparatus of any one of Aspects 1 to 4, wherein the one or more NNs include a neural network (NN), wherein determining the distortion prediction is based on a first output of the NN in response to the NN receiving the residual portion of the block as input, wherein determining the bit rate prediction is based on a second output of the NN in response to the NN receiving the residual portion of the block as input.

Aspect 6: The apparatus of any one of Aspects 1 to 5, wherein the one or more processors are configured to: receive metadata associated with a compression mode for the block; determine a bit rate residual prediction based on the one or more outputs of one or more neural networks (NNs) in response to the one or more NNs receiving the residual portion of the block as input; and determine a bit rate metadata prediction based on an output of a rate estimation engine in response to the rate estimation engine receiving the metadata as input, wherein the bit rate prediction is a sum of the bit rate residual prediction and the bit rate metadata prediction.

Aspect 7: The apparatus of any one of Aspects 1 to 6, wherein the function used to calculate the rate-distortion cost prediction is a sum of the distortion prediction and the bit rate prediction multiplied by a Lagrange multiplier.

Aspect 8: The apparatus of any one of Aspects 1 to 7, wherein the compression mode is one of inter-frame compression and intra-frame compression.

Aspect 9: The apparatus of any one of Aspects 1 to 8, wherein the one or more processors are configured to: generate compressed video data by compressing the video data based on the prediction mode for compressing the block.

Aspect 10: The apparatus of any one of Aspects 1 to 9, wherein the compressed video data is decodable using a decoder compliant with one or more video decoder standards.

Aspect 11: The apparatus of any one of Aspects 1 to 10, wherein the distortion prediction is determined in response to the one or more NNs receiving at least one of a quantization parameter (QP), a block size of the block, a compression mode, and information associated with the residual portion of the block; and wherein the bit rate prediction is determined in response to the one or more NNs receiving at least one of the QP, the block size of the block, the compression mode, and the information associated with the residual portion of the block.

Aspect 12: The apparatus of any one of Aspects 1 to 11, wherein the one or more processors are configured to: determine the QP.

Aspect 13: The apparatus of any one of Aspects 1 to 12, wherein a block size of the block is one of 4 square pixels, 8 square pixels, 16 square pixels, 32 square pixels, 64 square pixels, and 128 square pixels.

Aspect 14: The apparatus of any one of Aspects 1 to 13, wherein the one or more processors are configured to: calculate a second rate-distortion cost prediction based on a modified variant of the block with a different block size; and select a block size for the block based on a minimum of the rate-distortion cost prediction and the second rate-distortion cost prediction.

Aspect 15: The apparatus of any one of Aspects 1 to 14, wherein the one or more processors are configured to: calculate a second rate-distortion cost prediction based on a modified variant of the block with a different compression mode; and determine the prediction mode for compressing the block based on a minimum of the rate-distortion cost prediction and the second rate-distortion cost prediction.

Aspect 16: The apparatus of any one of Aspects 1 to 15, wherein the one or more processors are configured to: perform post-processing of the video data using the one or more NNs.

Aspect 17: The apparatus of any one of Aspects 1 to 16, wherein the one or more NNs include at least one of a convolutional neural network (CNN), a deep CNN, a neural network (NN) with fully connected layers, a CNN with fully connected layers, and a deep CNN with fully connected layers.

Aspect 18: A method of data encoding, the method comprising: receiving a residual portion of a block of a video frame of video data; determining a distortion prediction and a bit rate prediction based on one or more outputs of one or more neural networks (NNs) in response to the one or more NNs receiving the residual portion of the block as input; calculating a rate-distortion cost prediction as a function of the distortion prediction and the bit rate prediction; and determining, based on the rate-distortion cost prediction, a prediction mode for compressing the block.

Aspect 19: The method of Aspect 18, wherein the method is performed using least one of a mobile device, a wireless communication device, and a camera device.

Aspect 20: The method of any one of Aspects 18 to 19, wherein the one or more NNs include a first neural network (NN) and a second NN, wherein determining the distortion prediction is based on a first output of the first NN in response to the first NN receiving the residual portion of the block as input, wherein determining the bit rate prediction is based on a second output of the second NN in response to the second NN receiving the residual portion of the block as input.

Aspect 21: The method of any one of Aspects 18 to 20, wherein the one or more NNs include a neural network (NN), wherein determining the distortion prediction is based on a first output of the NN in response to the NN receiving the residual portion of the block as input, wherein determining the bit rate prediction is based on a second output of the NN in response to the NN receiving the residual portion of the block as input.

Aspect 22: The method of any one of Aspects 18 to 21, further comprising: receiving metadata associated with a compression mode for the block; determining a bit rate residual prediction based on the one or more outputs of one or more neural networks (NNs) in response to the one or more NNs receiving the residual portion of the block as input; and determining a bit rate metadata prediction based on an output of a rate estimation engine in response to the rate estimation engine receiving the metadata as input, wherein the bit rate prediction is a sum of the bit rate residual prediction and the bit rate metadata prediction.

Aspect 23: The method of any one of Aspects 18 to 22, wherein the function used to calculate the rate-distortion cost prediction is a sum of the distortion prediction and the bit rate prediction multiplied by a Lagrange multiplier.

Aspect 24: The method of any one of Aspects 18 to 23, wherein the compression mode is one of inter-frame compression and intra-frame compression.

Aspect 25: The method of any one of Aspects 18 to 24, further comprising: generating compressed video data by compressing the video data based on the prediction mode for compressing the block, wherein the compressed video data is decodable using a decoder compliant with one or more video decoder standards.

Aspect 26: The method of any one of Aspects 18 to 25, wherein the distortion prediction is determined in response to the one or more NNs receiving at least one of a quantization parameter (QP), a block size of the block, a compression mode, and information associated with the residual portion of the block; and wherein the bit rate prediction is determined in response to the one or more NNs receiving at least one of the QP, the block size of the block, the compression mode, and the information associated with the residual portion of the block.

Aspect 27: The method of any one of Aspects 18 to 26, further comprising: determining the QP.

Aspect 28: The method of any one of Aspects 18 to 27, further comprising: calculating a second rate-distortion cost prediction based on a modified variant of the block with a different block size; and selecting a block size for the block based on a minimum of the rate-distortion cost prediction and the second rate-distortion cost prediction.

Aspect 29: The method of any one of Aspects 18 to 28, further comprising: calculating a second rate-distortion cost prediction based on a modified variant of the block with a different compression mode; and determining the prediction mode for compressing the block based on a minimum of the rate-distortion cost prediction and the second rate-distortion cost prediction.

Aspect 30: A non-transitory computer readable storage medium having embodied thereon a program, wherein the program is executable by a processor to perform a method of data encoding, the method comprising: receiving a residual portion of a block of a video frame of video data; determining a distortion prediction and a bit rate prediction based on one or more outputs of one or more neural networks (NNs) in response to the one or more NNs receiving the residual portion of the block as input; calculating a rate-distortion cost prediction as a function of the distortion prediction and the bit rate prediction; and determining, based on the rate-distortion cost prediction, a prediction mode for compressing the block.

What is claimed is:

1. An apparatus for data encoding, the apparatus comprising:
a memory; and
one or more processors coupled to the memory, the one or more processors configured to:
determine a first residual portion of a block of a video frame of video data based on application of a first compression mode to the block;
determine a first distortion prediction and a first bit rate prediction based on first one or more outputs of one or more neural networks (NNs) in response to the one or more NNs processing the first residual portion of the block;
calculate a first rate-distortion cost prediction as a function of the first distortion prediction and the first bit rate prediction;
determine a second residual portion of the block of the video frame based on application of a second compression mode to the block, the second compression mode being different than the first compression mode;
determine a second distortion prediction and a second bit rate prediction based on second one or more outputs of the one or more NNs in response to the one or more NNs processing the second residual portion of the block;
calculate a second rate-distortion cost prediction as a function of the second distortion prediction and the second bit rate prediction; and determine, based on the first rate-distortion cost prediction and the second rate-distortion cost prediction, a prediction mode for compressing the block.

2. The apparatus of claim 1, wherein the apparatus is one of a mobile device, a wireless communication device, and a camera device.

3. The apparatus of claim 1, wherein the apparatus includes a camera, wherein the video data is captured by the camera.

4. The apparatus of claim 1, wherein the one or more NNs include a first neural network (NN) and a second NN, wherein the one or more processors are configured to:
determine the first distortion prediction based on a first output of the first NN in response to the first NN processing the first residual portion of the block; and
determine the first bit rate prediction based on a second output of the second NN in response to the second NN processing the first residual portion of the block.

5. The apparatus of claim 1, wherein the one or more NNs include a neural network (NN), wherein the one or more processors are configured to:
determine the first distortion prediction based on a first output of the NN in response to the NN processing the first residual portion of the block; and
determine the first bit rate prediction based on a second output of the NN in response to the NN processing the first residual portion of the block.

6. The apparatus of claim 1, wherein the one or more processors are configured to:
receive metadata associated with at least one of the first compression mode and the second compression mode for the block;
determine a bit rate residual prediction based on the first one or more outputs of the one or more NNs in response to the one or more NNs processing the first residual portion of the block; and
determine a bit rate metadata prediction based on an output of a rate estimation engine in response to the rate estimation engine processing the metadata, wherein the first bit rate prediction is a sum of the bit rate residual prediction and the bit rate metadata prediction.

7. The apparatus of claim 1, wherein the function used to calculate the first rate-distortion cost prediction is a sum of the first distortion prediction and the first bit rate prediction multiplied by a Lagrange multiplier.

8. The apparatus of claim 1, wherein the first compression mode is one of a first inter-frame compression mode and a first intra-frame compression mode, and wherein the second compression mode is one of a second inter-frame compression mode and a second intra-frame compression mode.

9. The apparatus of claim 1, wherein the one or more processors are configured to:
compress the video data to generate compressed video data based on the prediction mode determined for compressing the block.

10. The apparatus of claim 9, wherein the compressed video data is decodable using a decoder compliant with one or more video coding standards.

11. The apparatus of claim 1, wherein:
the first distortion prediction is determined further based on the one or more NNs processing at least one of a quantization parameter (QP), a block size of the block, a compression mode, and information associated with the first residual portion of the block; and
the first bit rate prediction is determined further based on the one or more NNs processing at least one of the QP, the block size of the block, the compression mode, and the information associated with the first residual portion of the block.

12. The apparatus of claim 11, wherein the one or more processors are configured to:
   determine the QP.

13. The apparatus of claim 1, wherein a block size of the block is one of 4 square pixels, 8 square pixels, 16 square pixels, 32 square pixels, 64 square pixels, and 128 square pixels.

14. The apparatus of claim 1, wherein the block used to determine the second residual portion has a different block size than the block used to determine the first residual portion, and wherein the one or more processors are configured to:
   select a block size for the block based on a minimum of the first rate-distortion cost prediction and the second rate-distortion cost prediction.

15. The apparatus of claim 1, wherein the one or more processors are configured to:
   determine the prediction mode for compressing the block based on a minimum of the first rate-distortion cost prediction and the second rate-distortion cost prediction.

16. The apparatus of claim 1, wherein the one or more processors are configured to:
   perform post-processing of the video data using the one or more NNs.

17. The apparatus of claim 1, wherein the one or more NNs include at least one of a convolutional neural network (CNN), a deep CNN, a neural network (NN) with fully connected layers, a CNN with fully connected layers, and a deep CNN with fully connected layers.

18. A method of data encoding, the method comprising:
   determining a first residual portion of a block of a video frame of video data based on application of a first compression mode to the block;
   determining a first distortion prediction and a first bit rate prediction based on first one or more outputs of one or more neural networks (NNs) in response to the one or more NNs processing the first residual portion of the block;
   calculating a first rate-distortion cost prediction as a function of the first distortion prediction and the first bit rate prediction;
   determining a second residual portion of the block of the video frame based on application of a second compression mode to the block, the second compression mode being different than the first compression mode;
   determining a second distortion prediction and a second bit rate prediction based on second one or more outputs of the one or more NNs in response to the one or more NNs processing the second residual portion of the block;
   calculating a second rate-distortion cost prediction as a function of the second distortion prediction and the second bit rate prediction; and
   determining, based on the first rate-distortion cost prediction and the second rate-distortion cost prediction, a prediction mode for compressing the block.

19. The method of claim 18, wherein the method is performed using least one of a mobile device, a wireless communication device, and a camera device.

20. The method of claim 18, wherein the one or more NNs include a first neural network (NN) and a second NN, wherein determining the first distortion prediction is based on a first output of the first NN in response to the first NN processing the first residual portion of the block, wherein determining the first bit rate prediction is based on a second output of the second NN in response to the second NN processing the first residual portion of the block.

21. The method of claim 18, wherein the one or more NNs include a neural network (NN), wherein determining the first distortion prediction is based on a first output of the NN in response to the NN processing the first residual portion of the block, wherein determining the first bit rate prediction is based on a second output of the NN in response to the NN processing the first residual portion of the block.

22. The method of claim 18, further comprising:
   receiving metadata associated with at least one of the first compression mode and the second compression mode for the block;
   determining a bit rate residual prediction based on the first one or more outputs of the one or more NNs in response to the one or more NNs processing the first residual portion of the block; and
   determining a bit rate metadata prediction based on an output of a rate estimation engine in response to the rate estimation engine processing the metadata, wherein the first bit rate prediction is a sum of the bit rate residual prediction and the bit rate metadata prediction.

23. The method of claim 18, wherein the function used to calculate the first rate-distortion cost prediction is a sum of the first distortion prediction and the first bit rate prediction multiplied by a Lagrange multiplier.

24. The method of claim 18, wherein the first compression mode is one of a first inter-frame compression mode and a first intra-frame compression mode, and wherein the second compression mode is one of a second inter-frame compression mode and a second intra-frame compression mode.

25. The method of claim 18, further comprising:
   compressing the video data to generate compressed video data based on the prediction mode determined for compressing the block, wherein the compressed video data is decodable using a decoder compliant with one or more video coding standards.

26. The method of claim 18, wherein:
   the first distortion prediction is determined further based on the one or more NNs processing at least one of a quantization parameter (QP), a block size of the block, a compression mode, and information associated with the first residual portion of the block; and
   the first bit rate prediction is determined further based on the one or more NNs processing at least one of the QP, the block size of the block, the compression mode, and the information associated with the first residual portion of the block.

27. The method of claim 26, further comprising:
   determining the QP.

28. The method of claim 18, wherein the block used to determine the second residual portion has a different block size than the block used to determine the first residual portion, and further comprising:
   selecting a block size for the block based on a minimum of the first rate-distortion cost prediction and the second rate-distortion cost prediction.

29. The method of claim 18, further comprising:
   determining the prediction mode for compressing the block based on a minimum of the first rate-distortion cost prediction and the second rate-distortion cost prediction.

30. A non-transitory computer readable storage medium having stored thereon instructions that, when executed by one or more processors, cause the one or more processors to:

determine a first residual portion of a block of a video frame of video data based on application of a first compression mode to the block;

determine a first distortion prediction and a first bit rate prediction based on first one or more outputs of one or more neural networks (NNs) in response to the one or more NNs processing the first residual portion of the block;

calculate a first rate-distortion cost prediction as a function of the first distortion prediction and the first bit rate prediction;

determine a second residual portion of the block of the video frame based on application of a second compression mode to the block, the second compression mode being different than the first compression mode;

determine a second distortion prediction and a second bit rate prediction based on second one or more outputs of the one or more NNs in response to the one or more NNs processing the second residual portion of the block;

calculate a second rate-distortion cost prediction as a function of the second distortion prediction and the second bit rate prediction; and determine, based on the first rate-distortion cost prediction and the second rate-distortion cost prediction, a prediction mode for compressing the block.

* * * * *